(12) United States Patent
Shiratani et al.

(10) Patent No.: US 11,761,168 B2
(45) Date of Patent: Sep. 19, 2023

(54) SHOVEL

(71) Applicant: SUMITOMO CONSTRUCTION MACHINERY CO., LTD., Tokyo (JP)

(72) Inventors: Ryuji Shiratani, Chiba (JP); Hiroyuki Kurokawa, Chiba (JP); Hajime Aragaki, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 17/160,560

(22) Filed: Jan. 28, 2021

(65) Prior Publication Data

US 2021/0189689 A1 Jun. 24, 2021

Related U.S. Application Data

(63) Continuation of application No. PCT/JP2019/029671, filed on Jul. 29, 2019.

(30) Foreign Application Priority Data

Jul. 31, 2018 (JP) ................................ 2018-144609

(51) Int. Cl.
  *E02F 9/20* (2006.01)
  *G05G 1/04* (2006.01)
(52) U.S. Cl.
  CPC ............ *E02F 9/2004* (2013.01); *G05G 1/04* (2013.01)
(58) Field of Classification Search
  None
  See application file for complete search history.

(56) References Cited

U.S. PATENT DOCUMENTS

| | | | |
|---|---|---|---|
| 3,131,574 A | 5/1964 | Clingerman | |
| 3,800,615 A | 4/1974 | Pilch | |
| 4,943,182 A | 7/1990 | Hoblingre | |
| 9,073,237 B2 | 7/2015 | Fiebeler | |
| 2006/0117891 A1 | 6/2006 | Ichiki et al. | |
| 2011/0284785 A1* | 11/2011 | Yoshimoto | E02F 9/2004 251/229 |
| 2013/0261902 A1 | 10/2013 | Zhdanov et al. | |
| 2016/0186410 A1* | 6/2016 | Shioji | E02F 9/26 296/190.1 |

(Continued)

FOREIGN PATENT DOCUMENTS

| | | | | |
|---|---|---|---|---|
| CN | 101884021 A | * | 11/2010 | ............... E02F 5/32 |
| CN | 105229552 A | * | 1/2016 | ............ G05G 1/015 |
| EP | 334704 | | 9/1989 | |

(Continued)

OTHER PUBLICATIONS

International Search Report for PCT/JP2019/029671 dated Oct. 15, 2019.

*Primary Examiner* — Vicky A Johnson
(74) *Attorney, Agent, or Firm* — IPUSA, PLLC

(57) ABSTRACT

A shovel includes an upper swing structure, a cab mounted on the upper swing structure, and an operating lever provided in the cab. The operating lever includes a lever part to which a grip part is fixed, a holder part to which the lever part is connected, and a joint part connecting the lever part and the holder part. The lever part is configured to be attachable to and detachable from the holder part in a tool-free manner with a predetermined manual operation on the joint part.

17 Claims, 22 Drawing Sheets

(56) References Cited

U.S. PATENT DOCUMENTS

2016/0252192 A1* 9/2016 Sheehan ............... F16C 11/069
　　　　　　　　　　　　　　　　　　　　251/231

FOREIGN PATENT DOCUMENTS

| | | |
|---|---|---|
| JP | S51-105733 U | 8/1976 |
| JP | S60-004693 U | 1/1985 |
| JP | S63-159693 U | 10/1988 |
| JP | H01-158825 U | 11/1989 |
| JP | H05-071251 U | 9/1993 |
| JP | H05-280546 | 10/1993 |
| JP | H08-000416 U | 2/1996 |
| JP | H09-079222 | 3/1997 |
| JP | 2003-083303 | 3/2003 |
| JP | 2003083303 A * | 3/2003 |
| JP | 2004-010210 | 1/2004 |
| JP | 2013-513493 | 4/2013 |
| JP | 2013-117112 | 6/2013 |
| JP | 2016-037704 | 3/2016 |
| KR | 20070005753 | 1/2007 |

* cited by examiner

SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2019/029671, filed on Jul. 29, 2019 and designating the U.S., which claims priority to Japanese patent application No. 2018-144609, filed on Jul. 31, 2018. The entire contents of the foregoing applications are incorporated herein by reference.

BACKGROUND

Technical Field

The present disclosure relates to shovels.

Description of Related Art

A shovel with adjustably positionable console boxes provided one on each side of an operator seat has been known. Operating levers are provided on the front of the console boxes provided one on each side of the operator seat. An operator can adjust the positions of the operating levers by tilting or vertically adjusting the positions of the console boxes.

SUMMARY

According to an aspect of the present invention, a shovel includes an upper swing structure, a cab mounted on the upper swing structure, and an operating lever provided in the cab. The operating lever includes a lever part to which a grip part is fixed, a holder part to which the lever part is connected, and a joint part connecting the lever part and the holder part. The lever part is configured to be attachable to and detachable from the holder part in a tool-free manner with a predetermined manual operation on the joint part.

DETAILED DESCRIPTION

The operator of the related-art shovel, however, may be unable to adjust the positions of the operating levers to optimal positions by only adjusting the positions of the console boxes.

Therefore, it is desired to provide a shovel with operating levers whose positions are more flexibly adjustable.

According to an aspect of the present invention, it is possible to provide a shovel with operating levers whose positions are more flexibly adjustable.

Figure 1:
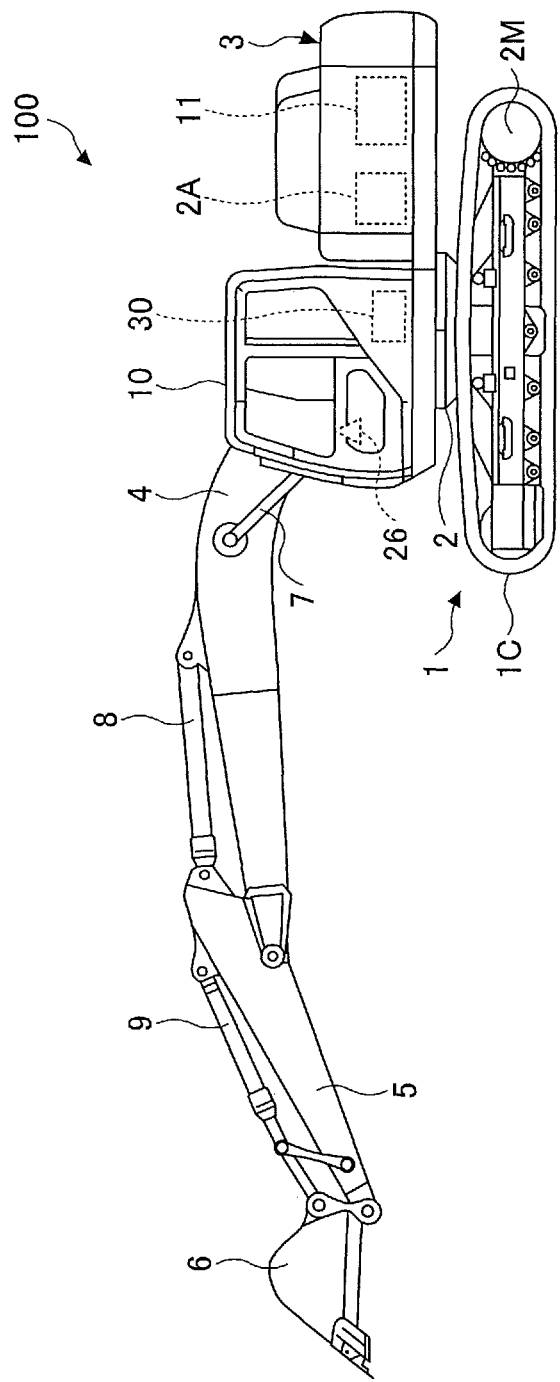
FIG. 1 is a side view of a shovel according to an embodiment of the present invention.

First, a shovel 100 serving as an excavator according to an embodiment of the present invention is, described with reference to FIG. 1. FIG. 1 is a side view of a shovel 100.

According to this embodiment, a lower traveling structure 1 of the shovel 100 includes a crawler 10. The crawler 10 is driven by travel hydraulic motors 2M mounted in the lower traveling structure 1. The travel hydraulic motors 2M may be replaced with travel motor generators serving as electric actuators. Specifically, the crawler 10 includes a left crawler and a right crawler. The left crawler is driven by a left travel hydraulic motor 2ML (see FIG. 2) and the right crawler is driven by a right travel hydraulic motor 2MR (see FIG. 2).

An upper swing structure 3 is swingably mounted on the lower traveling structure 1 via a swing mechanism 2. The swing mechanism 2 is driven by a swing hydraulic motor 2A mounted on the upper swing structure 3. The swing hydraulic motor 2A, however, may be replaced with a swing motor generator serving as an electric actuator.

A boom 4 is attached to the upper swing structure 3. An arm 5 is attached to the distal end of the boom 4. A bucket 6 serving as an end attachment is attached to the distal end of the arm 5. The boom 4, the arm 5, and the bucket 6 constitute an excavation attachment that is an example of an attachment. The boom 4 is driven by a boom cylinder 7. The arm 5 is driven by an arm cylinder 8. The bucket 6 is driven by a bucket cylinder 9.

A cabin 10 serving as a cab is provided and a power source such as an engine 11 is mounted on the upper swing structure 3. An operating device 26, a controller 30, etc., are provided in the cabin 10. In this specification, for convenience, the side of the upper swing structure 3 on which the boom 4 is attached is defined as the front side and the side of the upper swing structure 3 on which a counterweight is attached is defined as the back side.

The controller 30 is a control device for controlling the shovel 100. According to this embodiment, the controller 30 is constituted of a processor unit including a CPU, a volatile storage, and a nonvolatile storage. The controller 30 reads programs corresponding to functional elements from the nonvolatile storage, loads the programs into the volatile storage, and causes the CPU to execute corresponding processes.

Figure 2:
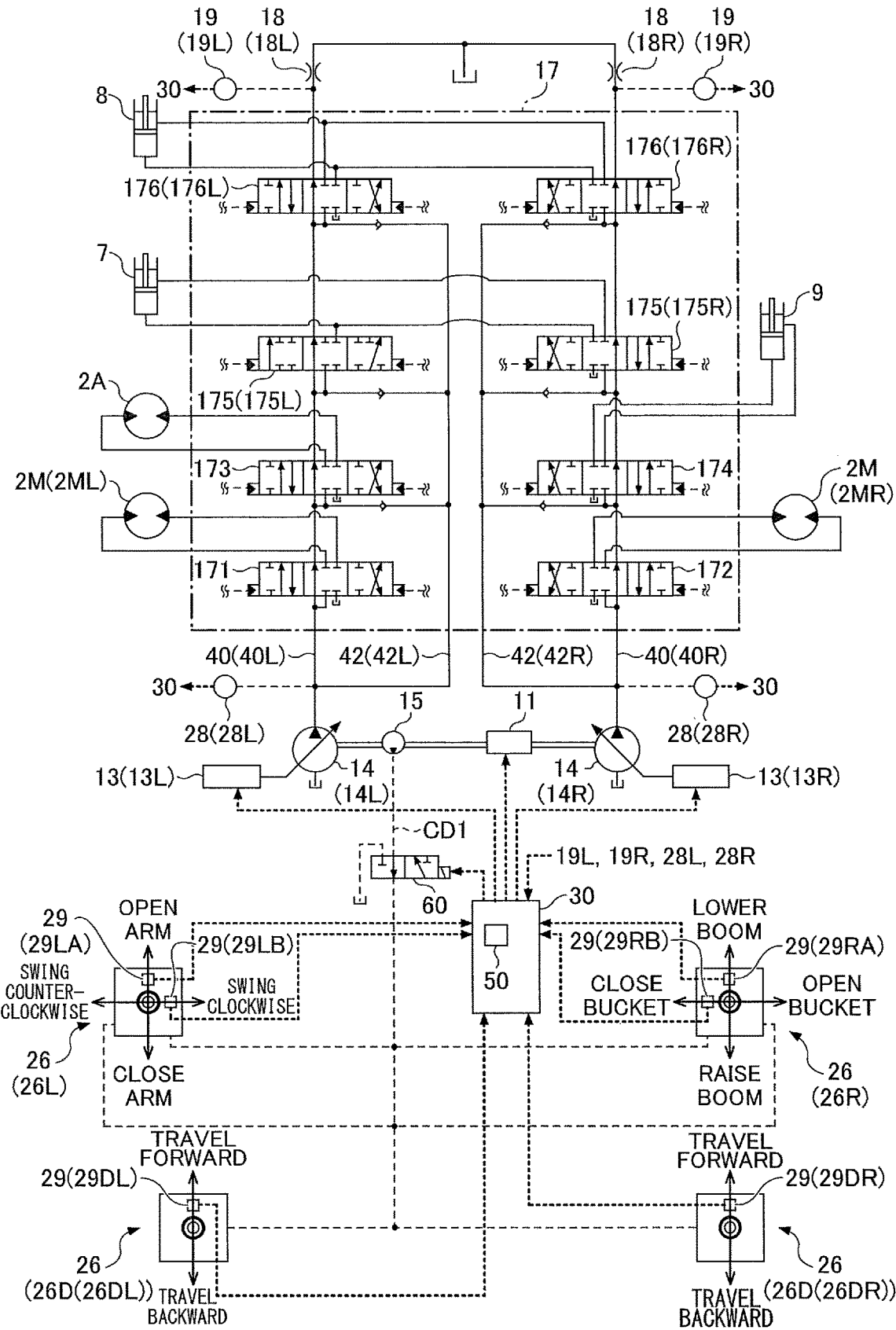
FIG. 2 is a diagram illustrating an example configuration of a hydraulic system installed in the shovel.

Next, an example configuration of a hydraulic system installed in the shovel 100 is described with reference to FIG. 2. FIG. 2 is a diagram illustrating an example configuration of the hydraulic system installed in the shovel 100. In FIG. 2, a mechanical power transmission line, a hydraulic oil line, a pilot line, and an electrical control line are indicated by a double line, a solid line, a dashed line, and a dotted line, respectively.

The hydraulic system of the shovel 100 mainly includes the engine 11, a regulator 13, a main pump 14, a pilot pump 15, a control valve unit 17, the operating device 26, a discharge pressure sensor 28, an operating pressure sensor 29, the controller 30, and a control valve 60.

In FIG. 2, the hydraulic system circulates hydraulic oil from the main pump 14 driven by the engine 11 to a hydraulic oil tank via a center bypass conduit 40 or a parallel conduit 42.

The engine 11 is a power source for the shovel 100. According to this embodiment, the engine 11 is, for example, a diesel engine that operates in such a manner as to maintain a predetermined rotational speed. The output shaft of the engine 11 is connected to the input shaft of each of the main pump 14 and the pilot pump 15.

The main pump 14 is configured to supply hydraulic oil to the control valve unit 17 via a hydraulic oil line. According to this embodiment, the main pump 14 is a swash plate variable displacement hydraulic pump.

The regulator 13 is configured to control the discharge quantity of the main pump 14. According to this embodiment, the regulator 13 controls the discharge quantity of the main pump 14 by adjusting the swash plate tilt angle of the main pump 14 in response to a control command from the controller 30.

The pilot pump 15 is configured to supply hydraulic oil to hydraulic control devices including the operating device 26 via a pilot line. According to this embodiment, the pilot pump 15 is a fixed displacement hydraulic pump. The pilot pump 15, however, may be omitted. In this case, the function carried by the pilot pump 15 may be implemented by the main pump 14. That is, the main pump 14 may have the function of supplying hydraulic oil to the operating device 26, etc., after reducing the pressure of the hydraulic oil with a throttle or the like, apart from the function of supplying hydraulic oil to the control valve unit 17.

The control valve unit 17 is configured to accommodate multiple control valves such that the control valves are operable. According to this embodiment, the control valve unit 17 includes control valves 171 through 176. The control valve 175 includes a control valve 175L and a control valve 175R. The control valve 176 includes a control valve 176L and a control valve 176R. The control valve unit 17 can selectively supply hydraulic oil discharged by the main pump 14 to one or more hydraulic actuators through the control valves 171 through 176. The control valves 171 through 176 control the flow rate of hydraulic oil flowing from the main pump 14 to the hydraulic actuators and the flow rate of hydraulic oil flowing from the hydraulic actuators to the hydraulic oil tank. The hydraulic actuators include the boom cylinder 7, the arm cylinder 8, the bucket cylinder 9, the left travel hydraulic motor 2ML, the right travel hydraulic motor 2MR, and the swing hydraulic motor 2A.

The operating device 26 is a device that the operator uses to operate actuators. The actuators include at least one of a hydraulic actuator and an electric actuator. According to this embodiment, the operating device 26 is configured to supply hydraulic oil discharged by the pilot pump 15 to a pilot port of a corresponding control valve in the control valve unit 17 via a pilot line. The pressure of hydraulic oil supplied to each pilot port (control pressure) is a pressure commensurate with the direction of operation and the amount of operation of a lever or a pedal (not depicted) of the operating device 26 corresponding to each hydraulic actuator.

The discharge pressure sensor 28 is configured to detect the discharge pressure of the main pump 14. According to this embodiment, the discharge pressure sensor 28 outputs a detected value to the controller 30.

The operating pressure sensor 29 is configured to detect the details of the operator's operation of the operating device 26. According to this embodiment, the operating pressure sensor 29 detects the direction of operation and the amount of operation of a lever or a pedal of the operating device 26 corresponding to each actuator in the form of pressure (operating pressure), and outputs the detected value to the controller 30. The operation details of the operating device 26 may also be detected using a sensor other than an operating pressure sensor.

The main pump 14 includes a left main pump 14L and a right main pump 14R. The left main pump 14L circulates hydraulic oil to the hydraulic oil tank via at least one of a left center bypass conduit 40L and a left parallel conduit 42L. The right main pump 14R circulates hydraulic oil to the hydraulic oil tank via at least one of a right center bypass conduit 40R and a right parallel conduit 42R.

The left center bypass conduit 40L is a hydraulic oil line that passes through the control valves 171, 173, 175L, and 176L placed in the control valve unit 17. The right center bypass conduit 40R is a hydraulic oil line that passes through the control valves 172, 174, 175R, and 176R placed in the control valve unit 17.

The control valve 171 is a spool valve that switches the flow of hydraulic oil so that hydraulic oil discharged by the left main pump 14L can be supplied to the left travel hydraulic motor 2ML and that hydraulic oil discharged by the left travel hydraulic motor 2ML can be discharged to the hydraulic oil tank.

The control valve 172 is a spool valve that switches the flow of hydraulic oil so that hydraulic oil discharged by the right main pump 14R can be supplied to the right travel hydraulic motor 2MR and that hydraulic oil discharged by the right travel hydraulic motor 2MR can be discharged to the hydraulic oil tank.

The control valve 173 is a spool valve that switches the flow of hydraulic oil so that hydraulic oil discharged by the left main pump 14L can be supplied to the swing hydraulic motor 2A and that hydraulic oil discharged by the swing hydraulic motor 2A can be discharged to the hydraulic oil tank.

The control valve 174 is a spool valve that switches the flow of hydraulic oil so that hydraulic oil discharged by the right main pump 14R can be supplied to the bucket cylinder 9 and that hydraulic oil in the bucket cylinder 9 can be discharged to the hydraulic oil tank.

The control valve 175L is a spool valve that switches the flow of hydraulic oil so that hydraulic oil discharged by the left main pump 14L can be supplied to the boom cylinder 7. The control valve 175R is a spool valve that switches the flow of hydraulic oil so that hydraulic oil discharged by the right main pump 14R can be supplied to the boom cylinder 7 and that hydraulic oil in the boom cylinder 7 can be discharged to the hydraulic oil tank.

The control valve 176L is a spool valve that switches the flow of hydraulic oil so that hydraulic oil discharged by the left main pump 14L can be supplied to the arm cylinder 8 and that hydraulic oil in the arm cylinder 8 can be discharged to the hydraulic oil tank.

The control valve 176R is a spool valve that switches the flow of hydraulic oil so that hydraulic oil discharged by the right main pump 14R can be supplied to the arm cylinder 8 and that hydraulic oil in the arm cylinder 8 can be discharged to the hydraulic oil tank.

The left parallel conduit 42L is a hydraulic oil line running parallel to the left center bypass conduit 40L. When the flow of hydraulic oil through the left center bypass conduit 40L is restricted or blocked by any of the control valves 171, 173 and 175L, the left parallel conduit 42L can supply hydraulic oil to a control valve further downstream. The right parallel conduit 42R is a hydraulic oil line running parallel to the right center bypass conduit 40R. When the flow of hydraulic oil through the right center bypass conduit 40R is restricted or blocked by any of the control valves 172, 174 and 175R, the right parallel conduit 42R can supply hydraulic oil to a control valve further downstream.

The regulator 13 includes a left regulator 13L and a right regulator 13R. The left regulator 13L controls the discharge quantity of the left main pump 14L by adjusting the swash plate tilt angle of the left main pump 14L in accordance with the discharge pressure of the left main pump 14L. Specifically, the left regulator 13L, for example, reduces the discharge quantity of the left main pump 14L by adjusting its swash plate tilt angle, according as the discharge pressure of the left main pump 14L increases. The same is the case with the right regulator 13R. This control, which is also referred to as power control (horsepower control), is performed in order to prevent the absorbed power (absorbed horsepower) of the main pump 14, expressed as the product of discharge pressure and discharge quantity, from exceeding the output power (output horsepower) of the engine 11.

The operating device 26 includes a left operating lever 26L, a right operating lever 26R, and travel levers 26D. The travel levers 26D include a left travel lever 26DL and a right travel lever 26DR.

The left operating lever 26L is used for swing operation and for operating the arm 5. The left operating lever 26L is operated forward or backward to introduce a control pressure commensurate with the amount of lever operation to a pilot port of the control valve 176, which is associated with the arm cylinder 8, using hydraulic oil discharged by the pilot pump 15. The left operating lever 26L is operated rightward or leftward to introduce a control pressure commensurate with the amount of lever operation to a pilot port of the control valve 173, which is associated with the swing hydraulic motor 2A, using hydraulic oil discharged by the pilot pump 15.

Specifically, the left operating lever 26L is operated in an arm closing direction to introduce hydraulic oil to the right pilot port of the control valve 176L and introduce hydraulic oil to the left pilot port of the control valve 176R. Furthermore, the left operating lever 26L is operated in an arm opening direction to introduce hydraulic oil to the left pilot port of the control valve 176L and introduce hydraulic oil to the right pilot port of the control valve 176R. Furthermore, the left operating lever 26L is operated in a counterclockwise swing direction to introduce hydraulic oil to the left pilot port of the control valve 173, and is operated in a clockwise swing direction to introduce hydraulic oil to the right pilot port of the control valve 173.

The right operating lever 26R is used to operate the boom 4 and operate the bucket 6. The right operating lever 26R is operated forward or backward to introduce a control pressure commensurate with the amount of lever operation to a pilot port of the control valve 175, which is associated with the boom cylinder 7, using hydraulic oil discharged by the pilot pump 15. The right operating lever 26R is operated rightward or leftward to introduce a control pressure commensurate with the amount of lever operation to a pilot port of the control valve 174, which is associated with the bucket cylinder 9, using hydraulic oil discharged by the pilot pump 15.

Specifically, the right operating lever 26R is operated in a boom lowering direction to introduce hydraulic oil to the right pilot port of the control valve 175R. Furthermore, the right operating lever 26R is operated in a boom raising direction to introduce hydraulic oil to the right pilot port of the control valve 175L and introduce hydraulic oil to the left pilot port of the control valve 175R. The right operating lever 26R is operated in a bucket closing direction to introduce hydraulic oil to the left pilot port of the control valve 174, and is operated in a bucket opening direction to introduce hydraulic oil to the right pilot port of the control valve 174.

The travel levers 26D are used to operate the crawler 1C. Specifically, the left travel lever 26DL is used to operate the left crawler. According to this embodiment, the left travel lever 26DL is configured to operate together with a left travel pedal. The left travel lever 26DL is operated forward or backward to introduce a control pressure commensurate with the amount of lever operation to a pilot port of the control valve 171, using hydraulic oil discharged by the pilot pump 15. The right travel lever 26DR is used to operate the right crawler. According to this embodiment, the right travel lever 26DR is configured to operate together with a right travel pedal. The right travel lever 26DR is operated forward or backward to introduce a control pressure commensurate with the amount of lever operation to a pilot port of the control valve 172, using hydraulic oil discharged by the pilot pump 15.

The discharge pressure sensor 28 includes a discharge pressure sensor 28L and a discharge pressure sensor 28R. The discharge pressure sensor 28L detects the discharge pressure of the left main pump 14L, and outputs the detected value to the controller 30. The same is the case with the discharge pressure sensor 28R.

The operating pressure sensor 29 includes operating pressure sensors 29LA, 29LB, 29RA, 29RB, 29DL and 29DR. The operating pressure sensor 29LA detects the details of the operator's forward or backward operation of the left operating lever 26L in the form of pressure, and outputs the detected value to the controller 30. Examples of the details of operation include the direction of lever operation and the amount of lever operation (the angle of lever operation).

Likewise, the operating pressure sensor 29LB detects the details of the operator's rightward or leftward operation of the left operating lever 26L in the form of pressure, and outputs the detected value to the controller 30. The operating pressure sensor 29RA detects the details of the operator's forward or backward operation of the right operating lever 26R in the form of pressure, and outputs the detected value to the controller 30. The operating pressure sensor 29RB detects the details of the operator's rightward or leftward operation of the right operating lever 26R in the form of pressure, and outputs the detected value to the controller 30. The operating pressure sensor 29DL detects the details of the operator's forward or backward operation of the left travel lever 26DL in the form of pressure, and outputs the detected value to the controller 30. The operating pressure sensor 29DR detects the details of the operator's forward or backward operation of the right travel lever 26DR in the form of pressure, and outputs the detected value to the controller 30.

The controller 30 receives the output of the operating pressure sensor 29, and outputs a control command to the regulator 13 to change the discharge quantity of the main pump 14 on an as-needed basis.

Here, negative control on the discharge quantity of the main pump 14 using a throttle 18 and a control pressure sensor 19 is described. The negative control is performed separately from the power control in order to control the discharge quantity of the main pump 14. The throttle 18 includes a left throttle 18L and a right throttle 18R and the control pressure sensor 19 includes a left control pressure sensor 19L and a right control pressure sensor 19R.

The left throttle 18L is placed between the most downstream control valve 176L and the hydraulic oil tank in the left center bypass conduit 40L. Therefore, the flow of hydraulic oil discharged by the left main pump 14L is restricted by the left throttle 18L. The left throttle 18L generates a control pressure for controlling the left regulator 13L. The left control pressure sensor 19L is a sensor for detecting this control pressure, and outputs a detected value to the controller 30. The controller 30 controls the discharge quantity of the left main pump 14L by adjusting the swash plate tilt angle of the left main pump 14L in accordance with this control pressure via the left regulator 13L. The controller 30 decreases the discharge quantity of the left main pump 14L as this control pressure increases, and increases the discharge quantity of the left main pump 14L as this control pressure decreases. The discharge quantity of the right main pump 14R is controlled in the same manner.

Specifically, as illustrated in FIG. 2, in a standby state where none of the hydraulic actuators is operated in the shovel 100, hydraulic oil discharged by the left main pump 14L arrives at the left throttle 18L through the left center bypass conduit 40L. The flow of hydraulic oil discharged by the left main pump 14L increases the control pressure generated upstream of the left throttle 18L. As a result, the controller 30 decreases the discharge quantity of the left main pump 14L to a minimum allowable discharge quantity to reduce pressure loss (pumping loss) during the passage of the discharged hydraulic oil through the left center bypass conduit 40L. In contrast, when any of the hydraulic actuators is operated, hydraulic oil discharged by the left main pump 14L flows into the operated hydraulic actuator via a control valve corresponding to the operated hydraulic actuator. The flow of hydraulic oil discharged by the left main pump 14L that arrives at the left throttle 18L is reduced in amount or lost, so that the control pressure generated upstream of the left throttle 18L is reduced. As a result, the controller 30 increases the discharge quantity of the left main pump 14L to cause sufficient hydraulic oil to flow into the operated hydraulic actuator to ensure driving of the operated hydraulic actuator. The controller 30 controls the discharge quantity of the right main pump 14R in the same manner.

According to the configuration as described above, the hydraulic system of FIG. 2 can reduce unnecessary energy consumption in the main pump 14 in the standby state. The unnecessary energy consumption includes pumping loss that hydraulic oil discharged by the main pump 14 causes in the center bypass conduit 40. Furthermore, in the case of actuating a hydraulic actuator, the hydraulic system of FIG. 2 can ensure that necessary and sufficient hydraulic oil is supplied from the main pump 14 to the hydraulic actuator to be actuated.

The control valve 60 is configured to be able to switch the enabled state and the disabled state of the operating device 26. According to this embodiment, the control valve 60 is a solenoid valve and is configured to operate in response to a current command from the controller 30. The control valve 60 may be constituted of a combination of a solenoid valve and a hydraulic valve. The enabled state of the operating device 26 is a state where the operator can move an associated driven body by operating the operating device 26. The disabled state of the operating device 26 is a state where the operator cannot move an associated driven body even when operating the operating device 26.

According to this embodiment, the control valve 60 is a spool solenoid valve that can switch the opening and closing of a pilot line CD1 connecting the pilot pump 15 and the operating device 26. Specifically, the control valve 60 is configured to be able to switch the opening and closing of the pilot line CD1 in response to a command from the controller 30. More specifically, the control valve 60 is configured to open the pilot line CD1 when in a first valve position and close the pilot line CD1 when in a second valve position. FIG. 2 illustrates that the control valve 60 is in the first position and that the pilot line CD1 is open.

The control valve 60 may also be configured to operate together with a gate lock lever that is not depicted. Specifically, the control valve 60 may also be configured to close the pilot line CD1 when the gate lock lever is pushed down and open the pilot line CD1 when the gate lock lever is pulled up.

Figure 3:
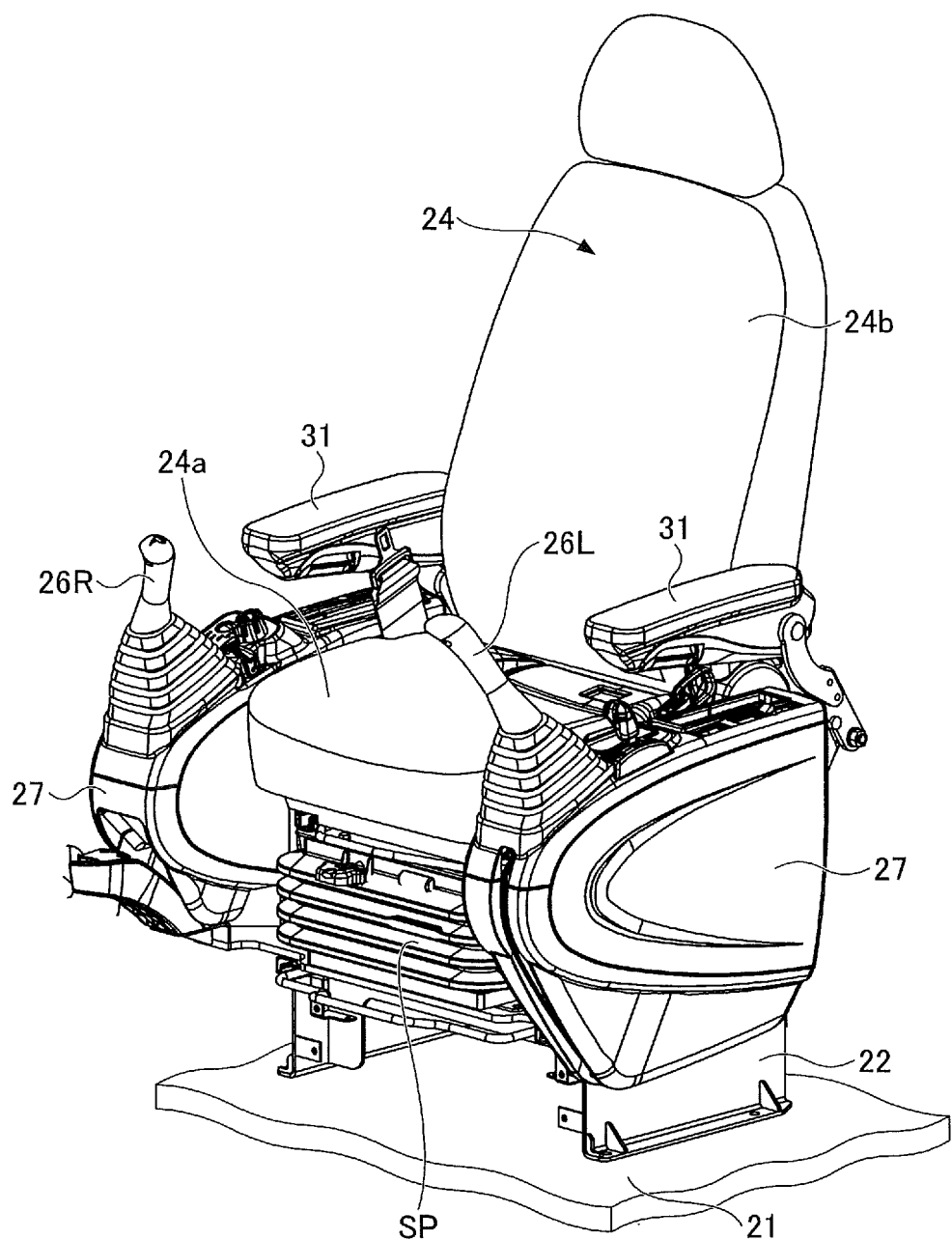
FIG. 3 is a perspective view of an operator seat unit provided in a cabin of the shovel.

Next, an operator seat unit 20 provided in the cabin 10 is described with reference to FIG. 3. FIG. 3 is a perspective view of the operator seat unit 20 provided in the cabin 10.

The operator seat unit 20 includes an operator seat 24, console boxes 27, armrests 31 on a base 22.

The operator seat unit 20 is installed on top of the base 22, which is fixed to a floor 21 serving as the floor of the cabin 10, through slide rails and base plates that are hidden in the console boxes 27. The base plates are configured to be slidable in a forward and a backward direction relative to the base 22 (the floor 21) through the slide rails. Accordingly, the operator seat unit 20 is configured to be adjustably positionable in the forward and the backward direction in the cabin 10.

The operator seat 24 includes a seat part 24a and a back part 24b. According to this embodiment, the operator seat 24 is supported on the base 22 through a suspension SP.

The console boxes 27 are installed one on each side of the operator seat 24. The left operating lever 26L, the right operating lever 26R, various switches, etc., for operating the shovel 100 are installed on the console boxes 27.

The console boxes 27 include console frames that are hidden inside. The console frames are fixed to the floor 21 through support frames and the base plates hidden in the console boxes 27 and the base 22.

The console frames may be configured to be tiltable relative to the support frames through tilt mechanisms. In this case, when the console frames tilt through tilt operations, the console boxes 27 also tilt, so that the left operating lever 26L and the right operating lever 26R also tilt together with the console boxes 27 as a unit. This is because the left operating lever 26L and the right operating lever 26R are attached to the console boxes 27.

The armrests 31 are members that the operator's elbows touch when the operator operates the shovel 100 using the left operating lever 26L, the right operating lever 26R, etc.

Figure 4:
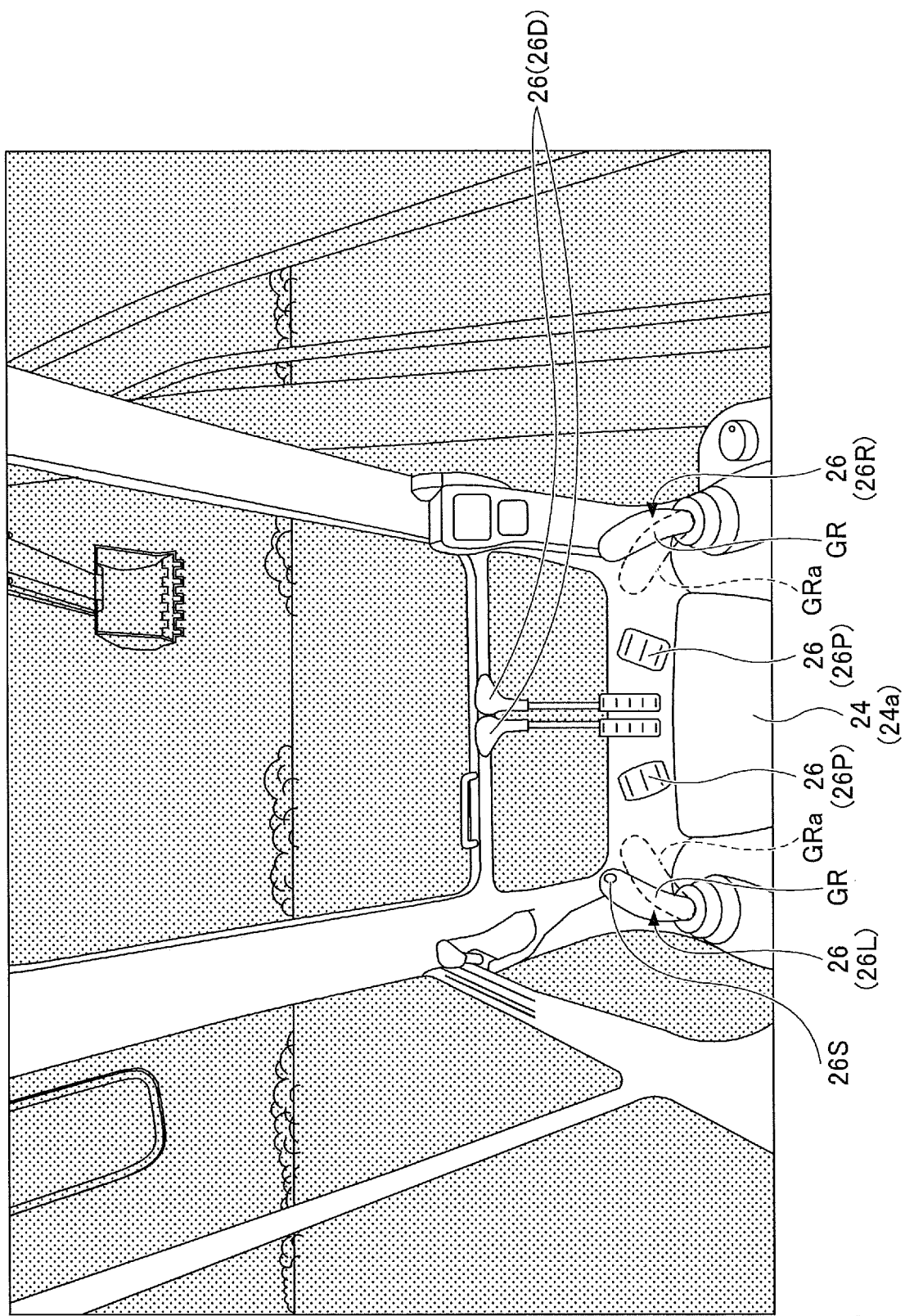
FIG. 4 is a perspective view of the inside of the cabin.

Next, the operating device 26 provided in the cabin 10 is described with reference to FIG. 4. FIG. 4 is a perspective view of the inside of the cabin 10, illustrating how it looks from the shovel 100 when the operator seated in the operator seat 24 looks forward.

According to the example of FIG. 4, the operating device 26 includes the left operating lever 26L, the right operating lever 26R, the travel levers 26D, and travel pedals 26P. The left operating lever 26L is an operating lever for the operations of opening and closing the arm 5 and swinging the upper swing structure 3. The right operating lever 26R is an operating lever for the operations of raising and lowering the boom 4 and opening and closing the bucket 6. The travel levers 26D are operating levers for driving the travel hydraulic motors 2M. The travel pedals 26P are operating pedals for driving the travel hydraulic motors 2M. The travel levers 26D and the travel pedals 26P are configured to operate in conjunction with each other.

A horn button 26S is a button for honking a horn, and is provided at the top of the left operating lever 26L. The operator can operate the horn button 26S with a finger without releasing a hand from the left operating lever 26L.

Figure 5:
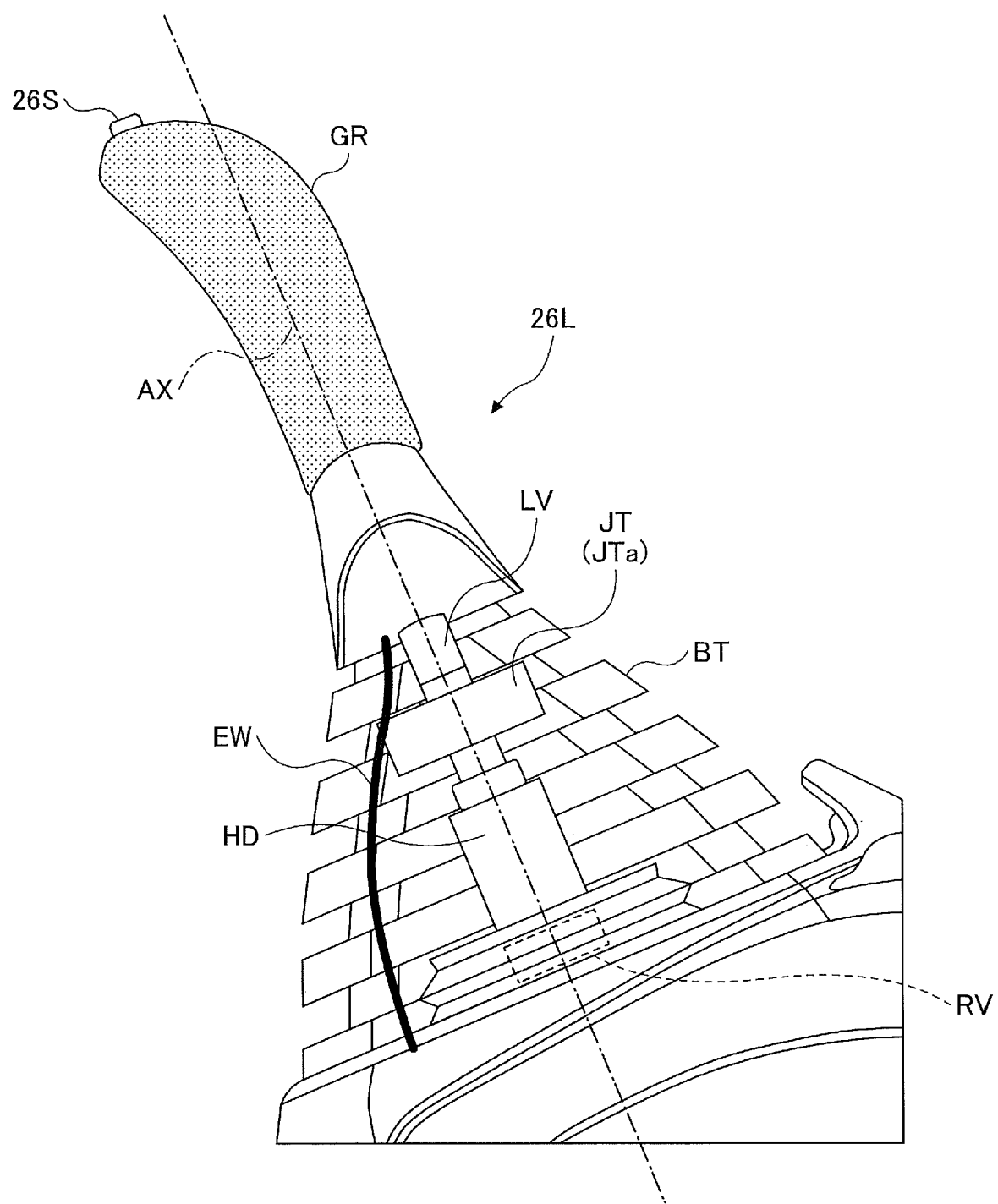
FIG. 5 is a side view of a left operating lever.

FIG. 5 is a left side view of the left operating lever 26L. FIG. 5 depicts only the right side portion of a boot BT so that the structure of members inside the boot BT can be seen. The left operating lever 26L and the right operating lever 26R have mirror image structures. Therefore, the following description of the left operating lever 26L also applies to the right operating lever 26R.

The left operating lever 26L mainly includes a signal wire EW, a grip part GR, a lever part LV, a joint part JT, and a holder part HD.

The grip part GR is a member that the operator holds with a hand when operating the left operating lever 26L. The grip part GR is fixed to the top end of the lever part LV. According to this embodiment, the grip part GR is made of synthetic resin.

The signal wire EW is a member that electrically connects components such as the horn button 26S installed on the grip part GR and components such as the controller 30 installed outside the left operating lever 26L.

The lever part LV is a member that is connected to the holder part HD via the joint part JT. According to this embodiment, the lever part LV is a cylindrical member and is made of metal.

The joint part JT is a member that connects the lever part LV and the holder part HD. The joint part JT is desirably configured such that a worker can perform tightening with the joint part JT and untightening with a predetermined operation (manual work) without using a tool. That is, the lever part LV is configured to be attachable to and detachable from in a tool-free manner with a predetermined manual operation on the joint part JT. According to the example of FIG. 5, the joint part JT is a clamping ring JTa (see FIGS. 7A and 7B) and connects the lever part LV and the holder part HD such that the lever part LV and the holder part HD are immovable relative to each other in the direction of an axis AX indicated by a one-dot chain line.

The holder part HD is a member to which the lever part LV is detachably attached. According to this embodiment, the holder part HD and the lever part LV are connected via a rotation preventing structure RPM that prevents rotation about the axis AX.

The holder part HD is fixed to a remote control valve RV. For example, when the left operating lever 26L is tilted forward or backward, the holder part HD as well is tilted forward or backward. In this case, the remote control valve RV introduces a control pressure commensurate with the amount of lever operation (for example, the tilt angle of the holder part HD) to a pilot port of the control valve 176, which is associated with the arm cylinder 8, using hydraulic oil discharged by the pilot pump 15. Likewise, when the left operating lever 26L is tilted leftward or rightward, the remote control valve RV introduces a control pressure commensurate with the amount of lever operation to a pilot port of the control valve 173, which is associated with the swing hydraulic motor 2A, using hydraulic oil discharged by the pilot pump 15.

Figure 6A:
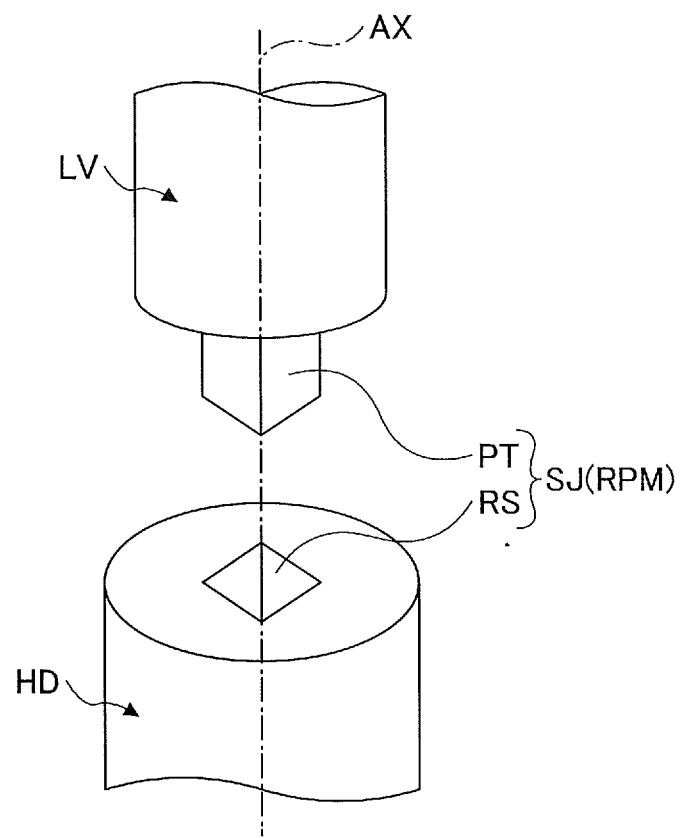
FIGS. 6A and 6B are a perspective view and a sectional view, respectively, of a spigot joint structure.
Figure 6B:
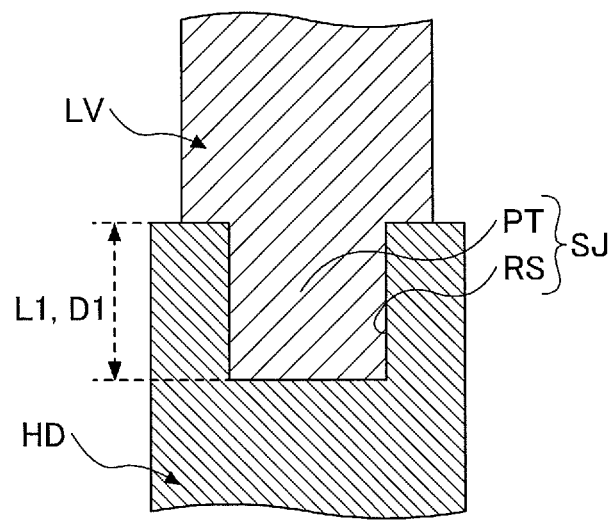

The rotation preventing structure RPM includes, for example, a spigot joint structure, a ball lock structure, or the like. FIGS. 6A and 6B illustrates an example configuration of a spigot joint structure SJ. Specifically, FIG. 6A is a perspective view of the spigot joint structure SJ, and FIG. 6B is a sectional view of the spigot joint structure SJ.

According to the example of FIGS. 6A and 6B, the lever part LV includes a protrusion PT in its end face facing the holder part HD, the protrusion PT protruding toward the holder part HD along the axis AX. The holder part HD includes a recess RS in its end face facing the lever part LV, the recess RS being depressed in such a manner as to mate with the protrusion PT of the lever part LV.

According to the example of FIGS. 6A and 6B, the protrusion PT has a quadrangular prism shape. The protrusion PT, however, may have another shape as long as the protrusion PT can prevent rotation about the axis AX by fitting into the recess RS. Examples of other shapes include other polygonal shapes such as a triangular prism shape and a hexagonal prism shape, an elliptic cylindrical shape, and a gear shape.

According to the example of FIGS. 6A and 6B, a length L1 of the protrusion PT is equal to a depth D1 of the recess RS. The length L1 of the protrusion PT, however, may also be greater than the depth D1 of the recess RS or smaller than the depth D1 of the recess RS. The left operating lever 26L and the right operating lever 26R may be configured such that their respective lengths can be changed by adjusting the length L1 of the protrusion PT.

The lever part LV and the holder part HD are connected in such a manner as to be unrotatable relative to each other by the rotation preventing structure RPM. Furthermore, the rotation preventing structure RPM limits the angular relationship between the lever part LV and the holder part HD when the lever part LV and the holder part HD are connected. Therefore, the rotation preventing structure RPM can prevent the lever part LV from being connected to the holder part HD with an inappropriate angular relationship.

A worker can easily remove the lever part LV from the holder part HD with a predetermined tool-free operation by manually releasing tightening with the joint part JT. Therefore, a worker can easily replace the lever part LV to which the grip part GR is fixed with another lever part LV.

The dotted line of FIG. 4 indicates that another grip part GRa whose angle of attachment is different from that of the grip part GR may be attached in place of the grip part GR. The operator of the shovel 100 may, for example, remove the lever part LV to which the standard grip part GR is fixed, attached in advance to the holder part HD, and instead attach the lever part LV to which her/his own grip part GRa is fixed. The operator of the shovel 100 that can execute a machine control function (an autonomous control function) may attach, to the holder part HD, the lever part LV to which a grip having multiple buttons used in executing the machine control function is fixed, instead of the lever part LV to which the standard grip part GR is fixed. The autonomous control function is a function for causing the shovel 100 to autonomously operate, and includes, for example, a function to cause a hydraulic actuator to autonomously operate independent of the details of the operator's operation of the operating device 26. In this case, the left operating lever 26L may be configured such that multiple signal wires EW (see FIG. 5) corresponding to the multiple buttons are appropriately disposed in the boot BT.

Figure 7A:
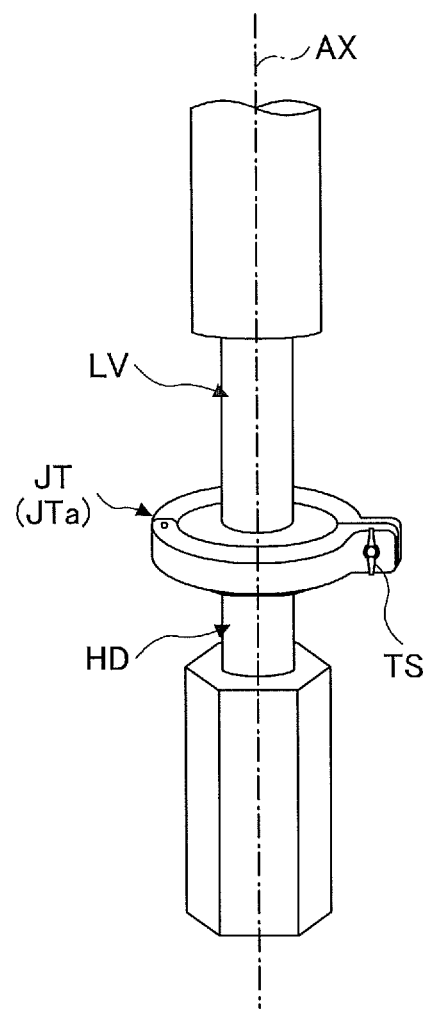
FIGS. 7A and 7B are a perspective view and a sectional view, respectively, of an example configuration of a lever part, a joint part, and a holder part.
Figure 7B:
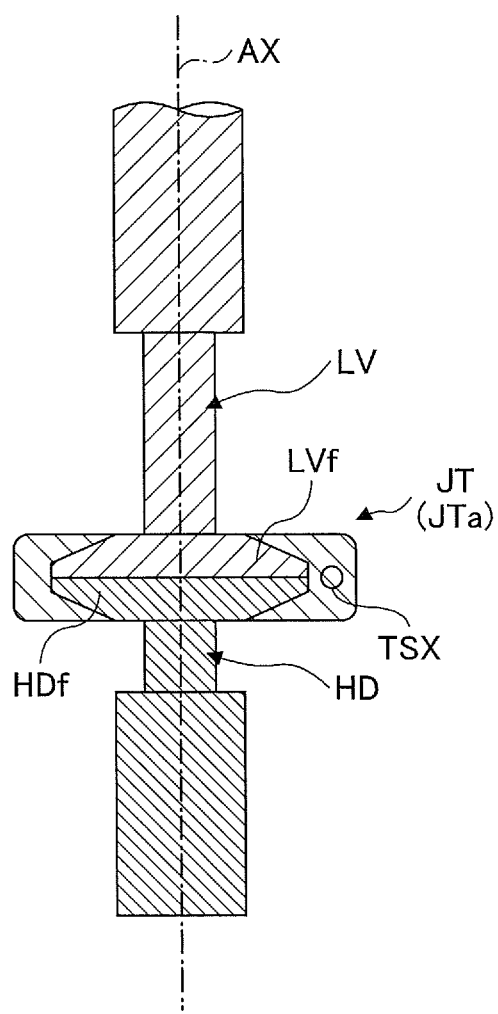

Next, an example configuration of the lever part LV, the joint part JT, and the holder part HD is described with reference to FIGS. 7A and 7B. FIGS. 7A and 7B illustrate an example configuration of the lever part LV, the joint part JT, and the holder part HD. Specifically, FIG. 7A is a perspective view of the lever part LV, the joint part JT, and the holder part HD, and FIG. 7B is a sectional view of the lever part LV, the joint part JT, and the holder part HD. According to the example of FIGS. 7A and 7B, the lever part LV and the holder part HD are connected via the rotation preventing structure RPM. For clarification, however, the graphical representation of the rotation preventing structure RPM is omitted in FIGS. 7A and 7B.

As illustrated in FIG. 7B, the lever part LV includes a tapered flange part LVf at its end facing the holder part HD, and the holder part HD includes a tapered flange part HDf at its end facing the lever part LV. The joint part JT is the clamping ring JTa including a thumbscrew TS that serves as an operating part moved by the force of the operator's fingers. The clamping ring JTa serves as an operated part that is moved or becomes movable by the movement of the operating part. The clamping ring JTa is placed in such a manner as to surround the tapered flange part LVf and the tapered flange part HDf and is tightened with the tapered flange part LVf and the tapered flange part HDf abutting against each other. According to this configuration, the clamping ring JTa serving as the operated part also serves as an engaging part, and the tapered flange part LVf and the tapered flange part HDf operate as engaged parts engaged with each other by the engaging part. The thumbscrew TS is a member for tightening the clamping ring JTa and includes a shaft TSX.

This configuration makes it possible for a worker to connect the lever part LV and the holder part HD without requiring a tool such that the lever part LV and the holder part HD are immovable relative to each other in the direction of the axis AX. The lever part LV is connected to the holder part HD via the rotation preventing structure RPM in such a manner as to be relatively unrotatable about the axis AX.

Figure 8A:
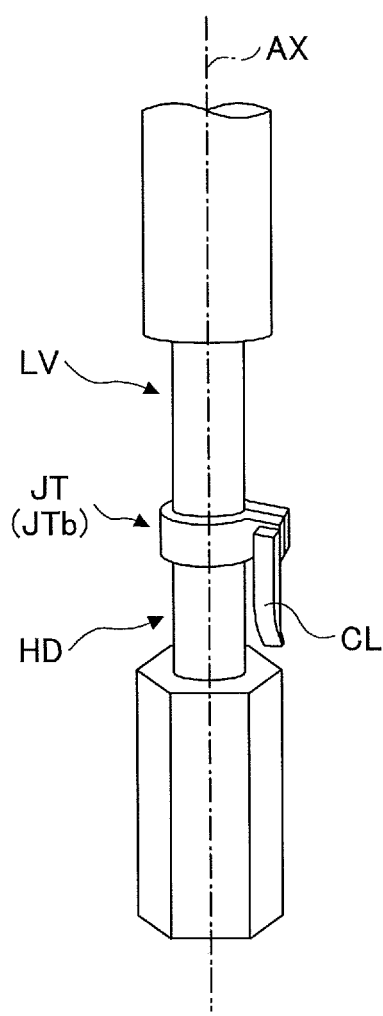
FIGS. 8A and 8B are a perspective view and a sectional view, respectively, of another example configuration of the lever part, the joint part, and the holder part.
Figure 8B:
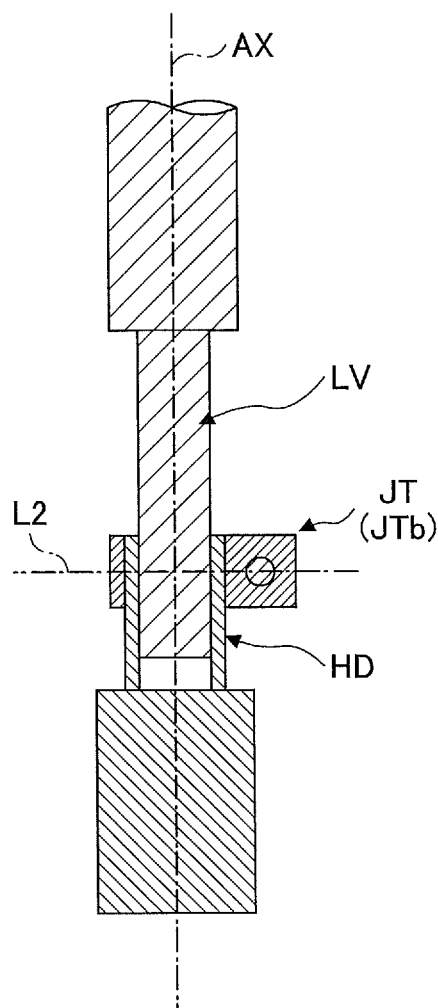
Figure 8C:
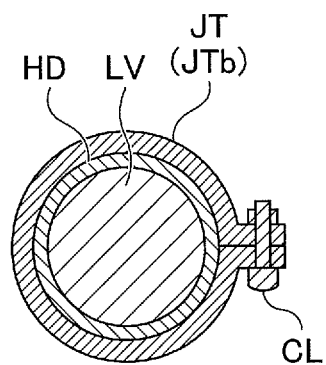
FIG. 8C is a diagram illustrating a cross section perpendicular to an axis including a one-dot chain line of FIG. 8B.

Next, another example configuration of the lever part LV, the joint part JT, and the holder part HD is described with reference to FIGS. 8A through 8C. FIGS. 8A through 8C illustrate another example configuration of the lever part LV, the joint part JT, and the holder part HD. Specifically, FIG. 8A is a perspective view of the lever part LV, the joint part JT, and the holder part HD, and FIG. 8B is a sectional view of the lever part LV, the joint part JT, and the holder part HD. FIG. 8C illustrates a cross section perpendicular to the axis AX including a one-dot chain line L2 of FIG. 8B. According to the example of FIGS. 8A through 8C, the lever part LV and the holder part HD are connected via the rotation preventing structure RPM. For clarification, however, the graphical representation of the rotation preventing structure RPM is omitted in FIGS. 8A through 8C.

As illustrated in FIG. 8B, the lever part LV is configured to have a cylinder at its end facing the holder part HD. The holder part HD is configured to have a cylindrical tube at its end facing the lever part LV. The holder part HD is configured such that a worker can fit the cylinder of the lever part LV into its cylindrical tube. The end of the lever part LV may alternatively be a prism, a square tube, a cylindrical tube, or the like. In this case, the end of the holder part HD may have another shape that can receive the end of the lever part LV. Furthermore, the cylindrical tube of the holder part HD may have a slit extending along the axis AX. Furthermore, while the end of the holder part HD is configured to surround and receive the end of the lever part LV according to the example of FIGS. 8A through 8C, the end of the lever part LV may be configured to surround and receive the end of the holder part HD.

The joint part JT is a clamping ring JTb including a cam lever CL. The clamping ring JTb may be a seat clamp lever used to fix the seatpost of a bicycle. The clamp ring JTb is placed outside the cylindrical tube of the holder HD where the cylindrical tube of the holder part HD and the cylinder of the lever part LV overlap each other, and is tightened by the cam lever CL. According to this configuration, the cam lever CL serves as an operating part, the clamping ring JTb serves as an operated part and an engaging part, the cylindrical tube of the holder part HD serves as an operated part and an engaging part, and the cylinder of the lever part LV serves as an engaged part engaged by the engaging part.

This configuration makes it possible for a worker to connect the lever part LV and the holder part HD without requiring a tool such that the lever part LV and the holder part HD are immovable relative to each other in the direction of the axis AX. The lever part LV is connected to the holder part HD via the rotation preventing structure RPM in such a manner as to be relatively unrotatable about the axis AX.

Figure 9A:
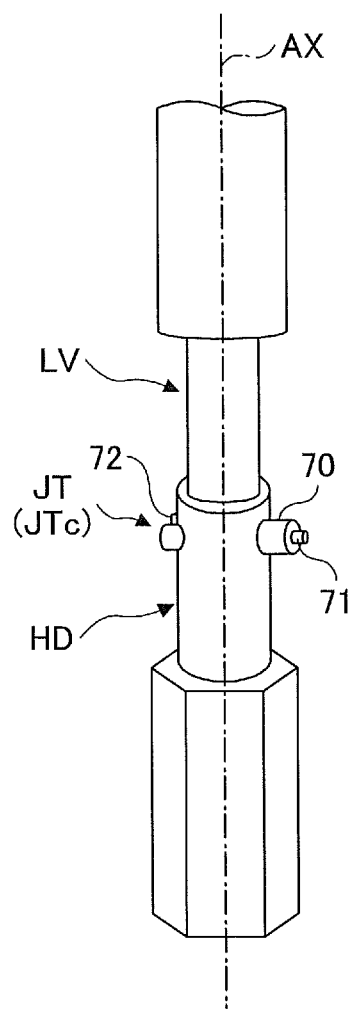
FIGS. 9A and 9B are a perspective view and a sectional view, respectively, of yet another example configuration of the lever part, the joint part, and the holder part.
Figure 9B:
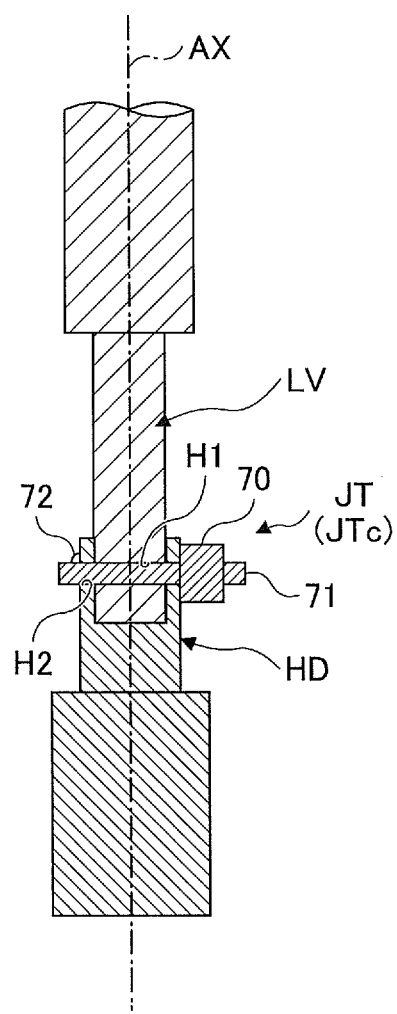

Next, yet another example configuration of the lever part LV, the joint part JT, and the holder part HD is described with reference to FIGS. 9A and 9B. FIGS. 9A and 9B illustrate yet another example configuration of the lever part LV, the joint part JT, and the holder part HD. Specifically, FIG. 9A is a perspective view of the lever part LV, the joint part JT, and the holder part HD, and FIG. 9B is a sectional view of the lever part LV, the joint part JT, and the holder part HD. According to the example of FIGS. 9A and 9B, the lever part LV and the holder part HD are connected via the rotation preventing structure RPM. For clarification, however, the graphical representation of the rotation preventing structure RPM is omitted in FIGS. 9A and 9B.

As illustrated in FIG. 9B, the lever part LV is configured to have a cylinder at its end facing the holder part HD. The holder part HD is configured to have a cylindrical tube at its end facing the lever part LV. The holder part HD is configured such that a worker can fit the cylinder of the lever part LV into its cylindrical tube. The end of the lever part LV may alternatively be a prism, a square tube, a cylindrical tube, or the like. In this case, the end of the holder part HD may have another shape that can receive the end of the lever part LV. Furthermore, while the end of the holder part HD is configured to surround and receive the end of the lever part LV according to the example of FIGS. 9A and 9B, the end of the lever part LV may be configured to surround and receive the end of the holder part HD.

The joint part JT is a pin lock mechanism JTc. The pin lock mechanism JTc is constituted mainly of a positioning pin 70, a button 71, and a retaining projection 72. The button 71 is used to retract the retaining projection 72. A worker can retract the retaining projection 72 into the positioning pin 70 by pushing the button 71 with a finger.

The positioning pin 70 is configured to pass through the holder part HD and the lever part LV through a hole H1 formed in the cylinder of the lever part LV and a hole H2 formed in the cylindrical tube of the holder part HD. A worker inserts the positioning pin 70 into the hole H1 and the hole H2 while pushing the button 71 with a finger, namely, keeping the retaining projection 72 retracted, with the hole H1 and the hole H2 being aligned. When the positioning pin 70 passes through the holder part HD and the lever part LV, the worker releases the finger from the button 71 to cause the retaining projection 72 to project from the positioning pin 70. According to this configuration, the pin lock mechanism JTc servers as an operating part, part of the pin lock mechanism JTc inserted into the space defined by the hole H1 and the hole H2 serves as an operated part and an engaging part, and the cylindrical tube of the lever part LV serves as an engaged part engaged by the engaging part.

This configuration makes it possible for a worker to connect the lever part LV and the holder part HD without requiring a tool such that the lever part LV and the holder part HD are immovable relative to each other in the direction of the axis AX. The lever part LV is connected to the holder part HD via the rotation preventing structure RPM in such a manner as to be relatively unrotatable about the axis AX.

Figure 10A:
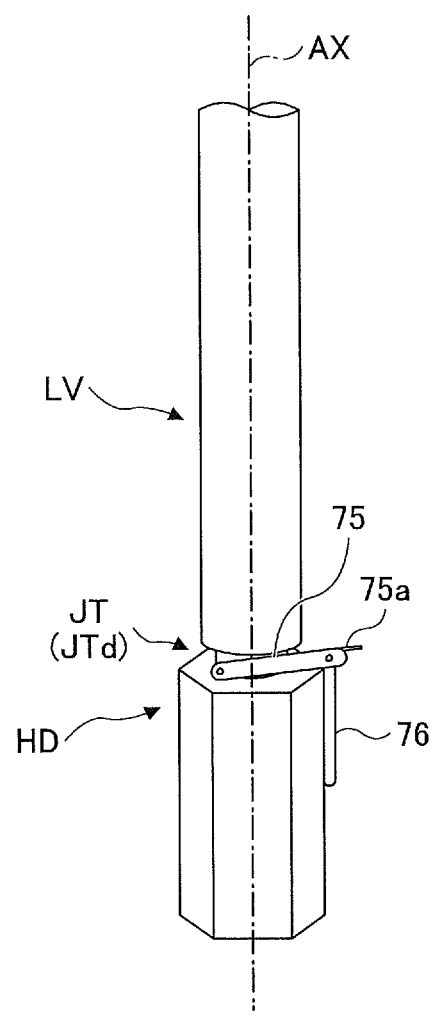
FIGS. 10A and 10B are a perspective view and a sectional view, respectively, of still another example configuration of the lever part, the joint part, and the holder part.
Figure 10B:
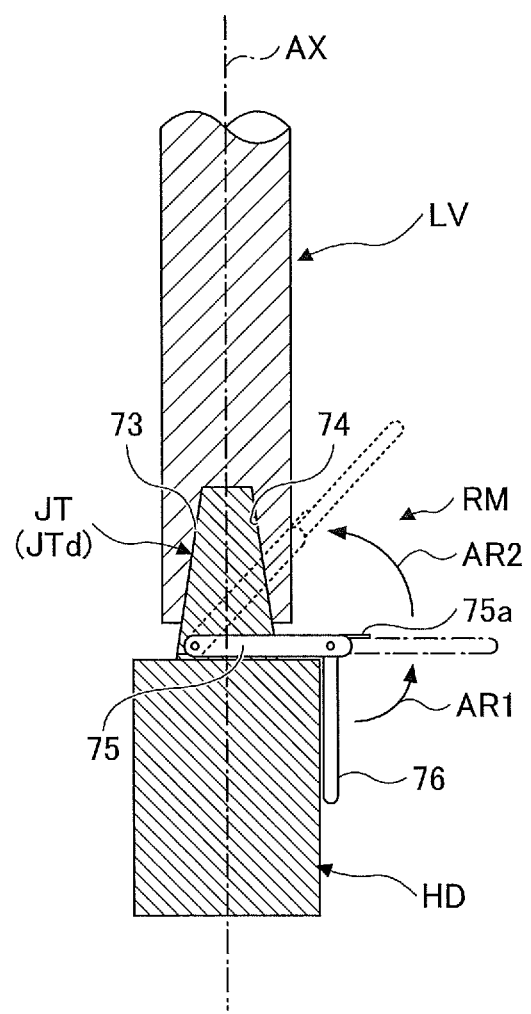

Next, still another example configuration of the lever part LV, the joint part JT, and the holder part HD is described with reference to FIGS. 10A and 10B. FIGS. 10A and 10B illustrate still another example configuration of the lever part LV, the joint part JT, and the holder part HD. Specifically, FIG. 10A is a perspective view of the lever part LV, the joint part JT, and the holder part HD, and FIG. 10B is a sectional view of the lever part LV, the joint part JT, and the holder part HD. According to the example of FIGS. 10A and 10B, the lever part LV and the holder part HD are connected via the rotation preventing structure RPM. For clarification, however, the graphical representation of the rotation preventing structure RPM is omitted in FIGS. 10A and 10B.

As illustrated in FIG. 10B, the holder part HD is configured to have a truncated conical protrusion 73 like a taper shank at its end facing the lever part LV. The lever part LV is configured to have a truncated conical recess 74 corresponding to the truncated conical protrusion 73 of the holder part HD at its end facing the holder part HD. The lever part LV is configured such that a worker can fit the truncated conical protrusion 73 of the holder part HD into the truncated conical recess 74. The truncated conical protrusion 73 may alternatively be a truncated pyramidal protrusion, a truncated elliptical conical protrusion, or the like. In this case, the truncated conical recess 74 is configured to fit a truncated pyramidal protrusion, a truncated elliptical conical protrusion, or the like. According to this configuration, the lever part LV serves as an operating part, the truncated conical recess 74 serves as an operated part and an engaging part, and the truncated conical protrusion 73 serves as an engaged part engaged by the engaging part.

According to the example of FIGS. 10A and 10B, the joint part JT is a taper fitting structure JTd famed of the truncated conical protrusion 73 and the truncated conical recess 74. Furthermore, according to the example of FIGS. 10A and 10B, the holder part HD includes a release mechanism RM. Furthermore, the taper fitting structure JTd, which is configured such that the truncated conical recess 74 of the lever part LV surrounds and receives the truncated conical protrusion 73 of the holder part HD according to the example of FIGS. 10A and 10B, may also be configured such that the truncated conical recess of the holder part HD surrounds and receives the truncated conical protrusion of the lever part LV.

The release mechanism RM is a lever mechanism for removing the lever part LV from the holder part HD, and includes a first lever 75 and a second lever 76. The second lever 76 is connected to the first lever 75 by a first pin, and the first lever 75 is connected to the holder part HD by a second pin. In removing the lever part LV from the holder part HD, a worker turns the second lever 76 about the first pin until the second lever 76 contacts a stopper 75a as indicated by arrow AR1 in FIG. 10B. The stopper 75a is a projection formed at the end of the first lever 75, and prevents the second lever 76 from turning a predetermined angle or more about the first pin relative to the first lever 75. A figure represented by a one-dot chain line in FIG. 10B indicates the second lever 76 contacting the stopper 75a. Thereafter, the worker turns the first lever 75 together with the second lever 76 about the second pin by further turning the second lever 76. The first lever 75 can turn about the second pin in a direction indicated by arrow AR2 by contacting an end face of the lever part LV facing the holder part HD and thereafter lifting the end face. A figure represented by a dotted line in FIG. 10B indicates the first lever 75 and the second lever 76 when lifting the end face of the lever part LV. Thus, a worker can manually remove the lever part LV from the holder part HD with a predetermined tool-free operation.

This configuration makes it possible for a worker to connect the lever part LV and the holder part HD without requiring a tool such that the lever part LV and the holder part HD are immovable relative to each other in the direction of the axis AX. The lever part LV is connected to the holder part HD via the rotation preventing structure RPM in such a manner as to be relatively unrotatable about the axis AX.

Figure 11A:
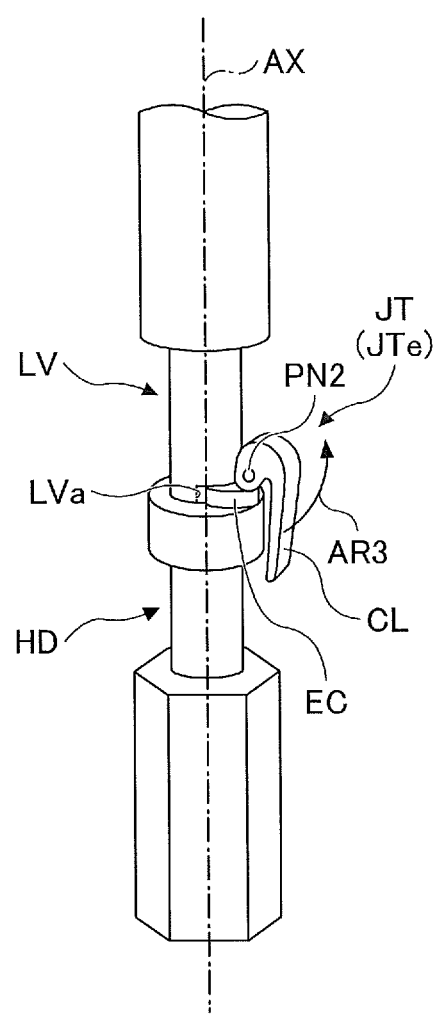
FIGS. 11A and 11B are a perspective view and a sectional view, respectively, of yet still another example configuration of the lever part, the joint part, and the holder part.
Figure 11B:
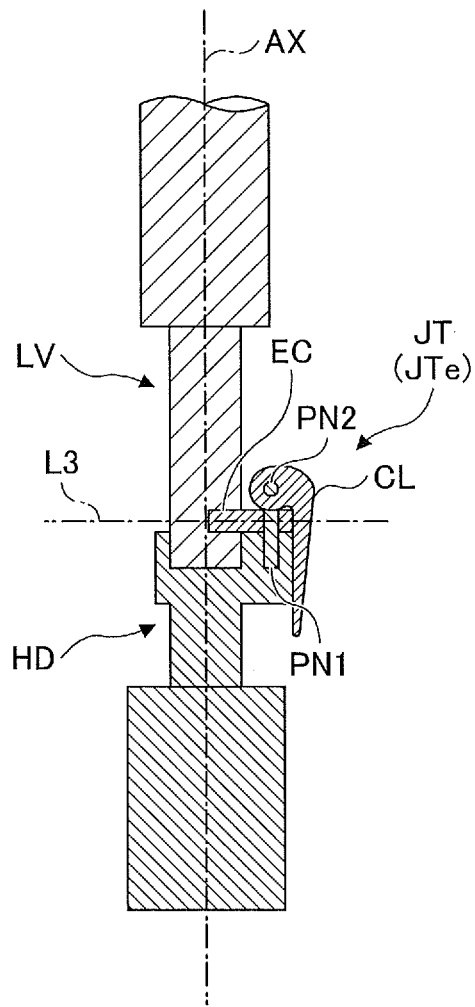
Figure 11C:
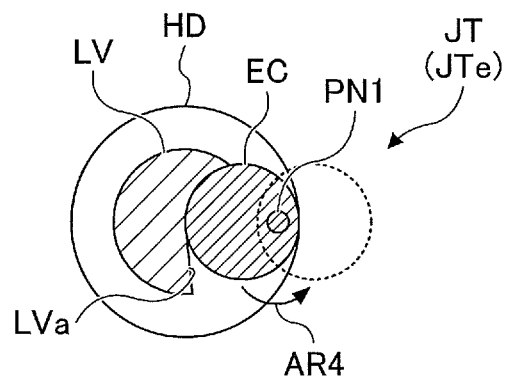
FIG. 11C is a diagram illustrating a cross section perpendicular to the axis including a one-dot chain line of FIG. 11B.

Next, yet still another example configuration of the lever part LV, the joint part JT, and the holder part HD is described with reference to FIGS. 11A through 11C. FIGS. 11A through 11C illustrate yet still another example configuration of the lever part LV, the joint part JT, and the holder part HD. Specifically, FIG. 11A is a perspective view of the lever part LV, the joint part JT, and the holder part HD, and FIG. 11B is a sectional view of the lever part LV, the joint part JT, and the holder part HD. FIG. 11C illustrates a cross section perpendicular to the axis AX including a one-dot chain line L3 of FIG. 11B. According to the example of FIGS. 11A through 11C, the lever part LV and the holder part HD are connected via the rotation preventing structure RPM. For clarification, however, the graphical representation of the rotation preventing structure RPM is omitted in FIGS. 11A through 11C.

As illustrated in FIG. 11B, the lever part LV is configured to have a cylinder at its end facing the holder part HD. The holder part HD is configured to have a cylindrical tube at its end facing the lever part LV. The holder part HD is configured such that a worker can fit the cylinder of the lever part LV into its cylindrical tube. The end of the lever part LV may alternatively be a prism, a square tube, a cylindrical tube, or the like. In this case, the end of the holder part HD may have another shape that can receive the end of the lever part LV.

The joint part JT is a clamping lever JTe with an eccentric cam. The clamping lever die with an eccentric cam is constituted mainly of an eccentric cam EC, a pin PN1, a pin PN2, and the cam lever CL. According to this configuration, the cam lever CL serves as an operating part, and the eccentric cam EC serves as an operated part and an engaging part. The lever part LV serves as an engaged part engaged by the engaging part. The eccentric cam EC is a member placed in such a manner as to be rotatable about the pin PN1, and is configured to fit in a recess LVa formed in the lever part LV. The cam lever CL is a member that presses the eccentric cam EC against the holder part HD, and is configured to be rotatable about the pin PN2 supported by the pin PN1. Each of FIGS. 11A through 11C illustrates that the eccentric cam EC fitting in the recess LVa is pressed down by the cam lever CL. A worker can release the eccentric cam EC from being pressed against the holder part HD by the cam lever CL by rotating the cam lever CL about the pin PN2 with the force of a finger as indicated by arrow AR3 in FIG. 11A. The eccentric cam EC released from the pressing can rotate about the pin PN1. A worker can disengage the eccentric cam EC from the recess LVa of the lever part LV by rotating the eccentric cam EC about the pin PN1 with the force of a finger as indicated by arrow AR4 in FIG. 11C. A figure represented by a dotted line in FIG. 11C indicates the eccentric cam EC rotated 180° about the pin PN1 to be at a release position. The release position means a position at which the fitting of the recess LVa of the lever part LV and the eccentric cam EC can be terminated. The lever part LV released from the fitting can move in the direction of the axis AX relative to the holder part HD. Thus, a worker can manually remove the lever part LV from the holder part HD with a predetermined tool-free operation.

This configuration makes it possible for a worker to connect the lever part LV and the holder part. HD without requiring a tool such that the lever part LV and the holder part HD are immovable relative to each other in the direction of the axis AX. The lever part LV is connected to the holder part HD via the rotation preventing structure RPM in such a manner as to be relatively unrotatable about the axis AX.

Figure 12A:
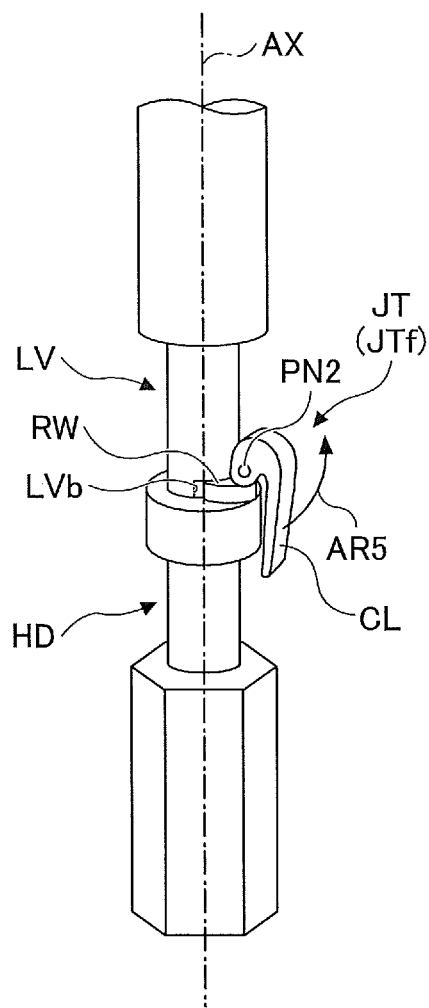
FIGS. 12A and 12B are a perspective view and a sectional view, respectively, of even another example configuration of the lever part, the joint part, and the holder part.
Figure 12B:
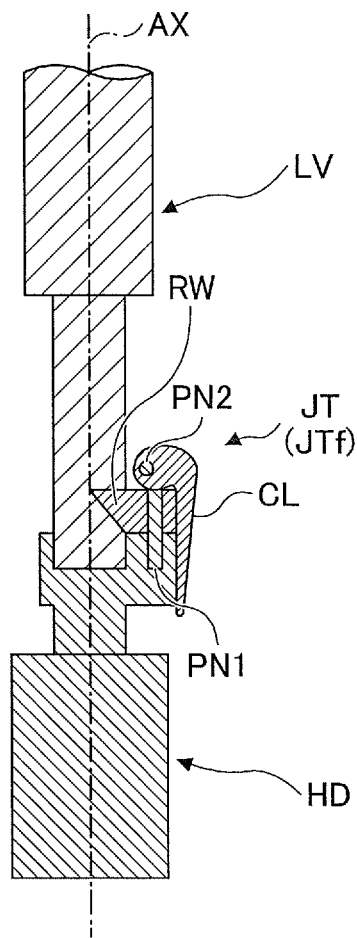
Figure 12C:
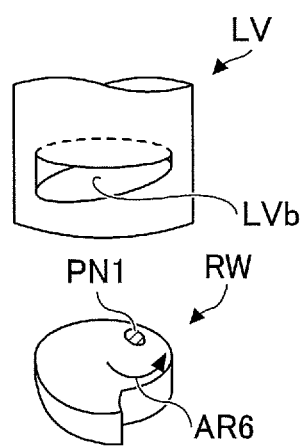
FIG. 12C is a perspective view of a rotary wedge that is a component of the joint part and a recess of the lever part in which the rotary wedge fits.

Next, even another example configuration of the lever part LV, the joint part JT, and the holder part HD is described with reference to FIGS. 12A through 12C. FIGS. 12A through 12C illustrate even another example configuration of the lever part LV, the joint part JT, and the holder part HD. Specifically, FIG. 12A is a perspective view of the lever part LV, the joint part JT, and the holder part HD, and FIG. 12B is a sectional view of the lever part LV, the joint part JT, and the holder part HD. FIG. 12C is a perspective view of a rotary wedge RW that is a component of the joint part JT and a recess LVb of the lever part LV in which the rotary wedge RW fits. According to the example of FIGS. 12A through 12C, the lever part LV and the holder part HD are connected via the rotation preventing structure RPM. For clarification, however, the graphical representation of the rotation preventing structure RPM is omitted in FIGS. 12A through 12C.

The joint part JT of FIGS. 12A through 12C are a clamping lever JTf with a rotary wedge. The clamping lever JTf with a rotary wedge is constituted mainly of the rotary wedge RW, the pin PN1, the pin PN2, and the cam lever CL. According to this configuration, the cam lever CL serves as an operating part, and the rotary wedge RW serves as an operated part and an engaging part. The lever part LV serves as an engaged part engaged by the engaging part.

The configuration of FIGS. 12A through 12C is different in using the clamping lever JTf with a rotary wedge from, but otherwise equal to, the configuration of FIGS. 11A through 11C which uses the clamping lever JTe with an eccentric cam including the eccentric cam EC. Therefore, a description of a common portion is omitted, and differences are described in detail.

The rotary wedge RW is a member placed in such a manner as to be rotatable about the pin PN1, and is configured to fit in the recess LVb formed in the lever part LV. The cam lever CL is a member that presses the rotary wedge RW against the holder part HD, and is configured to be rotatable about the pin PN2 supported by the pin PN1. Each of FIGS. 12A and 12B illustrates that the rotary wedge RW fitting in the recess LVb is pressed down by the cam lever CL. A worker can release the rotary wedge RW from being pressed against the holder part HD by the cam lever CL by rotating the cam lever CL about the pin PN2 with the force of a finger as indicated by arrow AR5 in FIG. 12A. The rotary wedge RW released from the pressing can rotate about the pin PN1. A worker can disengage the rotary wedge RW from the recess LVb of the lever part LV by rotating the rotary wedge RW about the pin PN1 with the force of a finger as indicated by arrow AR6 in FIG. 12C. The lever part LV released from the fitting can move in the direction of the axis AX relative to the holder part HD. Thus, a worker can manually remove the lever part LV from the holder part HD with a predetermined tool-free operation.

This configuration makes it possible for a worker to connect the lever part LV and the holder part HD without requiring a tool such that the lever part LV and the holder part HD are immovable relative to each other in the direction of the axis AX. The lever part LV is connected to the holder part HD via the rotation preventing structure RPM in such a manner as to be relatively unrotatable about the axis AX.

Figure 13A:
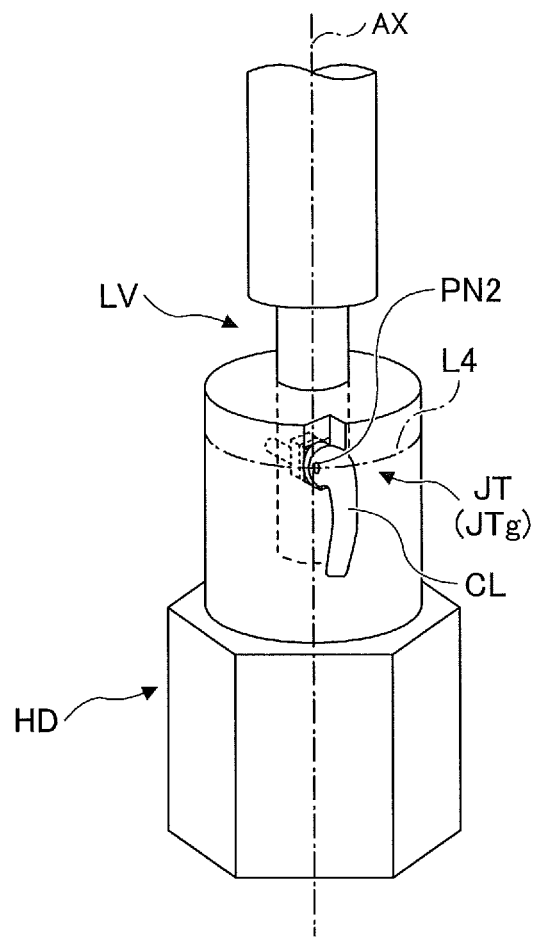
FIG. 13A is a perspective view of yet even another example configuration of the lever part, the joint part, and the holder part.
Figure 13B:
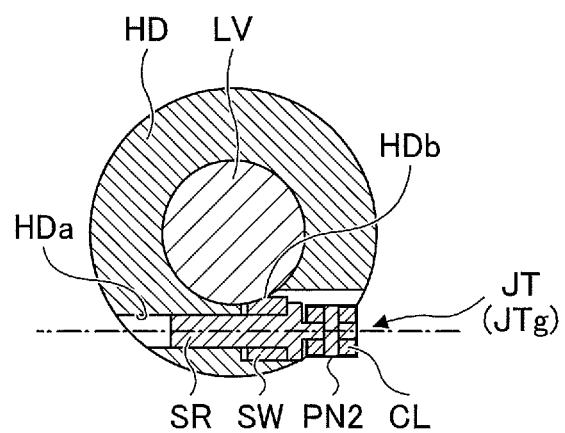
FIG. 13B is a diagram illustrating a cross section perpendicular to the axis including a one-dot chain line of FIG. 13A.

Next, yet even another example configuration of the lever part LV, the joint part JT, and the holder part HD is described with reference to FIGS. 13A and 13B. FIGS. 13A and 13B illustrate yet even another example configuration of the lever part LV, the joint part JT, and the holder part HD. Specifically, FIG. 13A is a perspective view of the lever part LV, the joint part JT, and the holder part HD, and FIG. 13B illustrates a cross section perpendicular to the axis AX including a one-dot chain line L4 of FIG. 13A. According to the example of FIGS. 13A and 13B, the lever part LV and the holder part HD are connected via the rotation preventing structure RPM. For clarification, however, the graphical representation of the rotation preventing structure RPM is omitted in FIGS. 13A and 13B.

As illustrated in FIG. 13A, the lever part LV is configured to have a cylinder at its end facing the holder part HD. The holder part HD is configured to have a cylindrical tube at its end facing the lever part LV. The holder part HD is configured such that a worker can fit the cylinder of the lever part LV into its cylindrical tube. The end of the lever part LV may alternatively be a prism, a square tube, a cylindrical tube, or the like. In this case, the end of the holder part HD may have another shape that can receive the end of the lever part LV. Furthermore, while the end of the holder part HD is configured to surround and receive the end of the lever part LV according to the example of FIGS. 13A and 13B the end of the lever part LV may be configured to surround and receive the end of the holder part HD.

The joint part JT is a clamping lever JTg with a sliding wedge. The clamping lever JTg with a sliding wedge is constituted mainly of a screw member SR, a sliding wedge SW, the pin PN2, and the cam lever CL. According to this configuration, the cam lever CL serves as an operating part, and the sliding wedge SW serves as an operated part and an engaging part. The lever part LV serves as an engaged part engaged by the engaging part.

The screw member SR is an example of a fastener member that is inserted into a through hole HDa formed in the cylinder of the holder part HD. According to the example of FIGS. 13A and 13B, the screw member SR is an externally threaded screw corresponding to an internal thread formed in the through hole HDa.

As illustrated in FIG. 13B, the through hole HDa extends through the cylindrical tube of the holder part HD in a direction perpendicular to the axis AX to form an opening HDb that exposes a surface of the lever part LV.

The sliding wedge SW is a member that is placed in the through hole HDa to be pressed against the lever part LV through the opening HDb. According to the example of FIGS. 13A and 13B, the sliding wedge SW is a collar member having a through hole through which the screw member SR passes. The sliding wedge SW is configured to have a curved surface that fits the external circumferential surface of the lever part LV in a part corresponding to the opening HDb.

A worker inserts the screw member SR to which the sliding wedge SW is attached into the through hole HDa with the cylinder of the lever part LV being inserted into the cylindrical tube of the holder part HD. The worker causes the sliding wedge SW to contact a surface of the lever part LV using the screw member SR and thereafter presses the sliding wedge SW against the surface of the lever part LV using the cam lever CL. Thus, a worker can manually connect the lever part LV to the holder part HD with a predetermined tool-free operation.

This configuration makes it possible for a worker to connect the lever part LV and the holder part HD without requiring a tool such that the lever part LV and the holder part HD are immovable relative to each other in the direction of the axis AX. The lever part LV is connected to the holder part HD via the rotation preventing structure RPM in such a manner as to be relatively unrotatable about the axis AX.

Figure 14A:
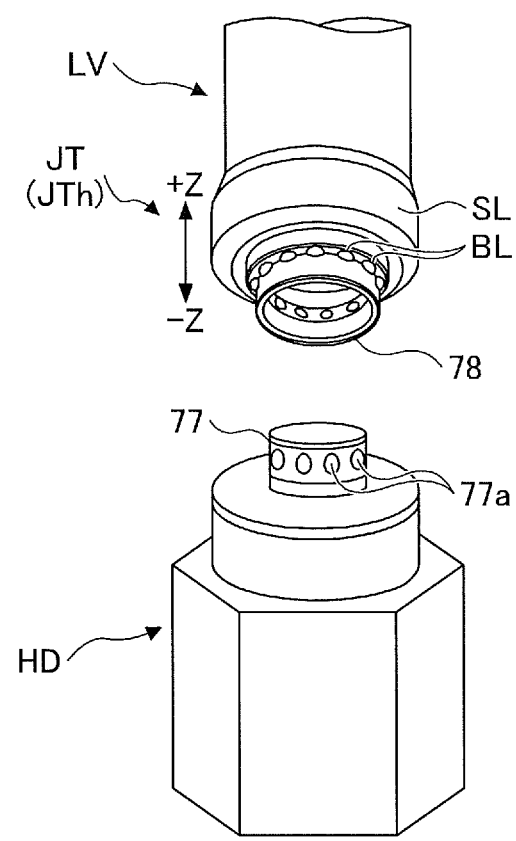
FIGS. 14A and 14B are perspective views of still even another example configuration of the lever part, the joint part, and the holder part.
Figure 14B:
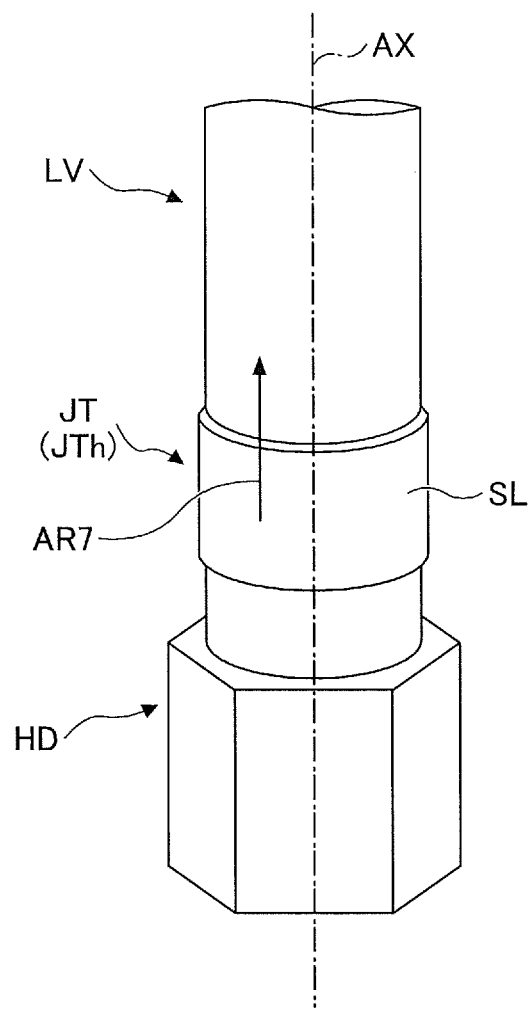

Next, still even another example configuration of the lever part LV, the joint part JT, and the holder part HD is described with reference to FIGS. 14A and 14B. FIGS. 14A and 14B illustrate still even another example configuration of the lever part LV, the joint part JT, and the holder part HD. Specifically, FIGS. 14A and 14B are perspective views of the lever part LV, the joint part JT, and the holder part HD. FIG. 14A illustrates the lever part LV and the holder part HD before being connected by the joint part JT, and FIG. 14B illustrates the lever part LV and the holder part HD after being connected by the joint part JT. According to the example of FIGS. 14A and 14B, the joint part JT serves as the rotation preventing structure RPM. Therefore, the spigot joint structure SJ is not employed.

As illustrated in FIG. 14A, the holder part HD is configured to have a cylinder 77 at its end facing the lever part LV. The lever part LV is configured to have a cylindrical tube 78 at its end facing the holder part HD. The lever part LV is configured such that a worker can fit the cylinder 77 of the holder part HD into the cylindrical tube 78. The cylinder 77 may alternatively be a prism, an elliptic cylinder, or the like. In this case, the cylindrical tube 78 is configured to fit a prism, an elliptic cylinder, or the like.

According to the example of FIGS. 14A and 14B, the joint part JT is a ball lock mechanism JTh. The ball lock mechanism JTh is constituted mainly of the cylinder 77, the cylindrical tube 78, balls BL, and a sleeve SL.

The sleeve SL is a member slidably attached to the end of the lever part LV facing the holder part HD, and can have a first state where the sleeve SL is moved in the +Z direction as illustrated in FIG. 14A and a second state where the sleeve SL is moved in the −Z direction (not depicted). The sleeve SL is typically urged in the −Z direction by an urging member such as a spring, and is in the second state when a worker is not in contact with the sleeve SL. That is, when a worker releases a hand from the sleeve SL in the first state, the sleeve SL returns to the second state.

The balls BL are configured to protrude outward from the external circumferential surface of the cylindrical tube 78 when the sleeve SL is in the first state and to protrude inward from the internal circumferential surface of the cylindrical tube 78 when the sleeve SL is in the second state. According to the example of FIGS. 14A and 14B, the balls BL are arranged at regular intervals along a circumferential direction of the cylindrical tube 78. The balls BL may also be arranged at irregular intervals along a circumferential direction of the cylindrical tube 78. This is for preventing the lever part LV from being connected to the holder part HD with an inappropriate angular relationship.

The balls BL are configured to engage with recesses 77a formed in the exterior circumferential surface of the cylinder 77 when the sleeve SL is in the second state, namely, when the balls BL are protruding inward from the internal circumferential surface of the cylindrical tube 78. When the balls BL are engaged with the recesses 77a, the lever part LV and the holder part HD are immovable relative to each other in the direction of the axis AX and are unrotatable relative to each other about the axis AX. According to this configuration, the lever part LV serves as an operating part and the balls BL serve as an operated part and an engaging part. The recesses 77a serve as an engaged part engaged by the engaging part.

A worker can engage the balls BL with the recesses 77a by pushing up the sleeve SL with the force of fingers into the first state of FIG. 14A, fitting the cylinder 77 into the cylindrical tube 78, and thereafter releasing a hand from the sleeve SL to return the sleeve SL to the second state. That is, a worker can manually connect the lever part LV to the holder part HD with a predetermined tool-free operation.

The sleeve SL may also be configured such that when the cylindrical tube 78 is pressed against the cylinder 77, the sleeve SL automatically and temporarily enters the first state using the pressing force and that when the balls BL thereafter engage with the recesses 77a, the sleeve SL automatically returns to the second state using a spring force.

Furthermore, a worker brings about a state where the balls BL can protrude from the exterior circumferential surface of the cylindrical tube 78 by pushing up the sleeve SL with the force of fingers in a direction indicated by arrow AR7 in FIG. 14B. In this state, by lifting the lever part LV, the worker can manually separate the lever part LV from the holder part HD with a predetermined tool-free operation.

This configuration makes it possible for a worker to connect the lever part LV and the holder part HD without requiring a tool such that the lever part LV and the holder part HD are immovable relative to each other in the direction of the axis AX and are unrotatable relative to each other about the axis AX.

As described above, the shovel 100 according to an embodiment of the present invention includes the upper swing structure 3, the cabin 10 mounted on the upper swing structure 3, and an operating lever provided in the cabin 10. The operating lever includes a left operating lever 26L and a right operating lever 26R. The operating lever includes a lever part LV to which a grip part GR is fixed, the holder part HD to which the lever part LV is connected, and the joint part JT connecting the lever part LV and the holder part HD. The lever part LV is configured to be attachable to and detachable from the holder part HD in a tool-free manner with a predetermined manual operation on the joint part JT. That is, the lever part LV is configured to be manually replaceable with ease.

According to this configuration, the shovel 100 allows more flexible adjustment of the position of the operating lever because multiple lever parts LV to which various grip parts GR that differ in shape, width, length, or the like are fixed can be attached and detached. As a result, the operator can select and use the lever part LV that fits her/his own body shape (shoulder width, arm length, hand size, or the like). The operator can also select and use the lever part LV that provides a preferable grip position. The operator can also change the lever part LV according to the work details of the shovel 100. The operator can also easily replace the lever part LV that is damaged, contaminated or degraded with another lever part LV. Therefore, the shovel 100 can meet the operator's high requirements with respect to the operating lever.

Furthermore, because the lever part LV is configured to be replaceable, the operating lever does not have to have an adjustment mechanism for adjusting the angle of fixation of the lever part LV about the axis AX. Therefore, it is possible to prevent the occurrence of problems due to the looseness, backlash, failure, or the like of the adjustment mechanism.

The lever part LV is desirably connected to the holder part HD via the joint part JT. According to this configuration, the lever part LV and the holder part HD are connected to be immovable relative to each other in the direction of the axis AX. Therefore, the backlash, looseness, undesirable extension and contraction, etc., of the lever part LV are prevented with more reliability.

The joint part JT may be, for example, the clamping ring JTa including the thumbscrew TS as illustrated in FIGS. 7A and 7B. The lever part LV may include the tapered flange part LVf serving as a first flange part, and the holder part HD may include the tapered flange part HDf serving as a second flange part. In this case, the tapered flange part LVf and the tapered flange part HDf are clamped together by the clamping ring JTa, so that the lever part LV is connected to the holder part HD. This configuration makes it possible for a worker to easily remove the lever part LV from the holder part HD without using a tool. Furthermore, a worker can easily attach a lever part LV different from the removed lever part LV to the holder part HD without using a tool.

The lever part LV may also be connected to the holder part HD by, for example, the clamping ring JTb including the cam lever CL (see FIGS. 8A through 8C), the pin lock mechanism JTc (see FIGS. 9A and 9B), the taper fitting structure JTd (see FIGS. 10A and 10B), the clamp lever JTe with an eccentric cam (see FIGS. 11A through 11C), the clamp lever JTf with a rotary wedge (see FIGS. 12A through 12C), or the clamp lever JTg with a sliding wedge (see FIGS. 13A and 13B). This configuration makes it possible for a worker to connect the lever part LV and the holder part HD without requiring a tool such that the lever part LV and the holder part HD are immovable relative to each other in the direction of the axis AX.

The operating lever desirably includes a rotation preventing structure. In this case, the rotation preventing structure is, for example, the spigot joint structure SJ. The rotation preventing structure can ensure that the lever part LV is prevented from rotating relative to the holder part HD.

The lever part LV may also be connected to the holder part HD by the ball lock mechanism JTh (see FIGS. 14A and 14B). This configuration makes it possible for a worker to connect the lever part LV and the holder part HD without requiring a tool such that the lever part LV and the holder part HD are immovable relative to each other in the direction of the axis AX and are unrotatable relative to each other about the axis AX.

An embodiment of the present invention is described in detail above. The present invention, however, is not limited to the above-described embodiment. Various variations, substitutions, etc., may be applied to the above-described embodiment without departing from the scope of the present invention. Furthermore, the separately described features may be combined to the extent that no technical contradiction is caused.

For example, according to the above-described embodiment, a hydraulic operation system including a hydraulic pilot circuit is disclosed. Specifically, in a hydraulic pilot circuit associated with the left operating lever 26L, hydraulic oil supplied from the pilot pump 15 to the remote control valve RV of the left operating lever 26L is conveyed to a pilot port of the control valve 176 serving as an arm control valve at a flow rate commensurate with the degree of opening of the remote control valve RV opened or closed by the tilt of the left operating lever 26L.

Instead of a hydraulic operation system including such a hydraulic pilot circuit, however, an electric operation system with an electric pilot circuit including an electric operating lever may be adopted. In this case, the amount of lever operation of the electric operating lever is input to the controller 30 as an electrical signal. Furthermore, a solenoid valve is placed between the pilot pump 15 and a pilot port of each control valve. The solenoid valve is configured to operate in response to an electrical signal from the controller 30. According to this configuration, when a manual operation using the electric operating lever is performed, the controller 30 can move each control valve in the control valve unit 17 by increasing or decreasing a pilot pressure by controlling the solenoid valve with an electrical signal commensurate with the amount of lever operation. Each control valve may be constituted of a solenoid spool valve. In this case, the solenoid spool valve operates in response to an electrical signal from the controller 30 commensurate with the amount of lever operation of the electric operating lever.

When an electric operation system including an electric operating lever is adopted, the controller 30 can more easily execute an autonomous control function than in the case where a hydraulic operation system including a hydraulic operating lever is adopted.

Figure 15:
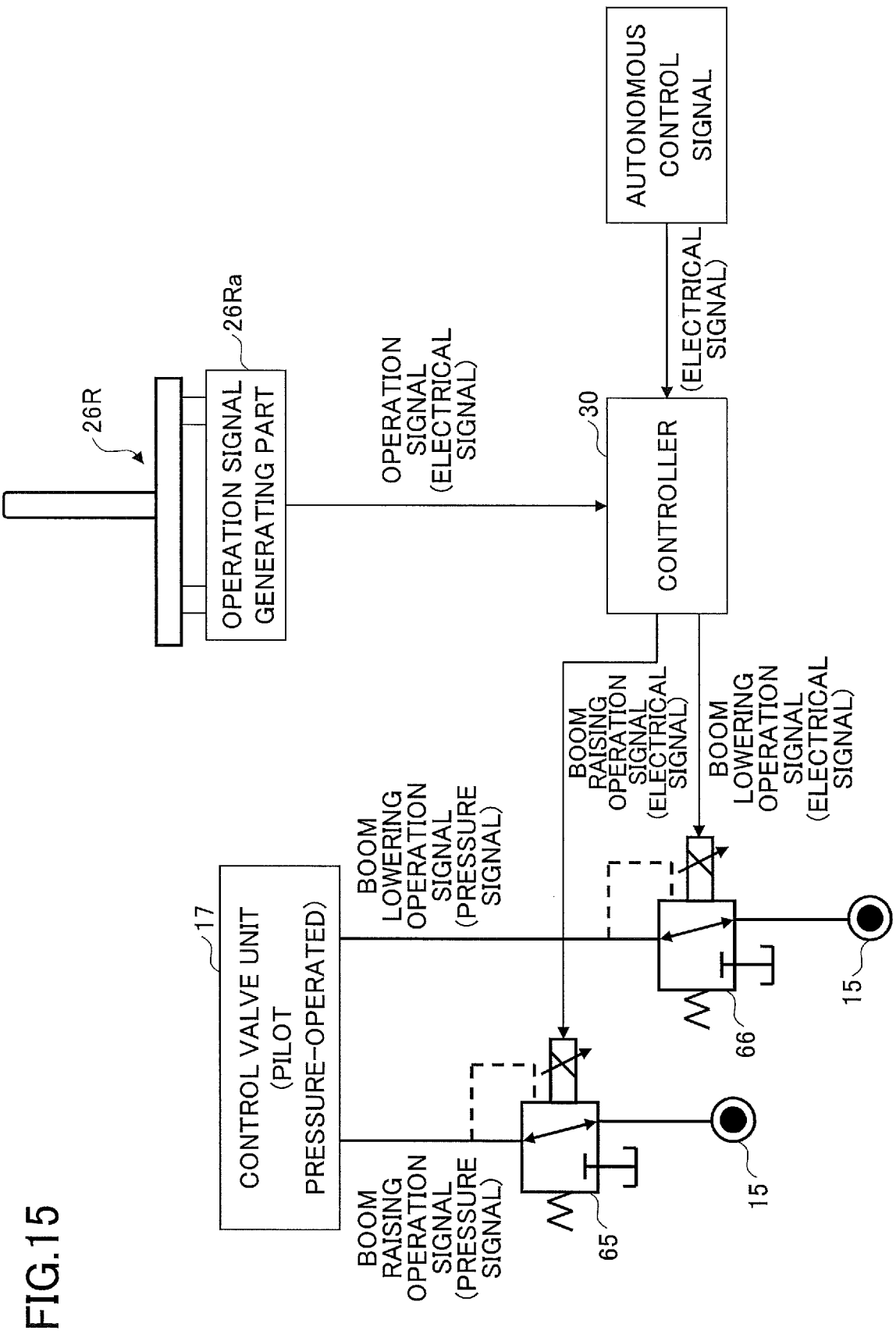
FIG. 15 is a diagram illustrating an example configuration of an electric operation system.

FIG. 15 illustrates an example configuration of an electric operation system. Specifically, the electric operation system of FIG. 15 is an example of a boom operation system, and is constituted mainly of the pilot pressure-operated control valve unit 17, the right operating lever 26R serving as an electric operating lever, the controller 30, a solenoid valve 65 for boom raising operation, and a solenoid valve 66 for boom lowering operation. The electric operation system of FIG. 15 may also be likewise applied to an arm operation system, a bucket operation system, a swing operation system, a travel operation system, etc.

As illustrated in FIG. 2, the pilot pressure-operated control valve unit 17 includes the control valve 171 associated with the left travel hydraulic motor 2ML, the control valve 172 associated with the right travel hydraulic motor 2MR, the control valve 173 associated with the swing hydraulic motor 2A, the control valve 174 associated with the bucket cylinder 9, the control valve 175 associated with the boom cylinder 7, the control valve 176 associated with the arm cylinder 8, etc. The solenoid valve 65 is configured to be able to adjust the flow area of a conduit connecting the pilot pump 15 and the raising-side pilot port of the control valve 175. The solenoid valve 66 is configured to be able to adjust the flow area of a conduit connecting the pilot pump 15 and the lowering-side pilot port of the control valve 175.

When a manual operation is performed, the controller 30 generates a boom raising operation signal (electrical signal) or a boom lowering operation signal (electrical signal) in accordance with an operation signal (electrical signal) output by an operation signal generating part 26Ra of the right operating lever 26R. The operation signal output by the operation signal generating part 26Ra of the right operating lever 26R is an electrical signal that changes in accordance with the amount of operation and the direction of operation of the right operating lever 26R.

Specifically, when the right operating lever 26R is operated in the boom raising direction, the controller 30 outputs a boom raising operation signal (electrical signal) commensurate with the amount of lever operation to the solenoid valve 65. The solenoid valve 65 adjusts the flow area in accordance with the boom raising operation signal (electrical signal) to control a pilot pressure serving as a boom raising operation signal (pressure signal) that acts on the raising-side pilot port of the control valve 175. Likewise, when the right operating lever 26R is operated in the boom lowering direction, the controller 30 outputs a boom lowering operation signal (electrical signal) commensurate with the amount of lever operation to the solenoid valve 66. The solenoid valve 66 adjusts the flow area in accordance with the boom lowering operation signal (electrical signal) to control a pilot pressure serving as a boom lowering operation signal (pressure signal) that acts on the lowering-side pilot port of the control valve 175.

In the case of executing the autonomous control function, the controller 30, for example, generates the boom raising operation signal (electrical signal) or the lowering operation signal (electrical signal) in accordance with an autonomous control signal (electrical signal) instead of responding to the operation signal (electrical signal) output by the operation signal generating part 26Ra of the right operating lever 26R. The autonomous control signal may be an electrical signal generated by the controller 30 or an electrical signal generated by an external control device other than the controller 30.

What is claimed is:

1. A shovel comprising:
   an upper swing structure;
   a cab mounted on the upper swing structure;
   an operator seat installed in the cab;
   a console box installed on the operator seat;
   a boot attached to the console box; and
   an operating lever provided in the cab,
   wherein the operating lever includes
      a lever part to which a grip part is fixed,
      a holder part to which the lever part is connected, and
      a joint part connecting the lever part and the holder part and positioned outside the console box,
   the lever part is detachably attached to the holder part via the joint part,
   the joint part is covered by the boot, and
   the holder part is configured to move together with the operating lever.

2. The shovel as claimed in claim 1, wherein the joint part includes an operating part and an operated part.

3. The shovel as claimed, in claim 1, wherein the lever part is an operating part, and
   the joint part is an operated part.

4. The shovel as claimed in claim 1, wherein the joint part is a clamping ring, including a thumbscrew.

5. The shovel as claimed in claim 1, wherein
   the lever part includes a first flange part,
   the holder part includes a second flange part, and
   the lever part is connected to the holder part with the first flange part and the second flange part being tightened by the joint part.

6. The shovel as claimed in claim 1, wherein the lever part is connected to the holder part by a clamping ring including a cam lever, a pin lock mechanism, a taper fitting structure, a clamp lever with an eccentric cam, a clamp lever with a rotary wedge, or a clamp lever with a sliding wedge.

7. The shovel as claimed in claim 1, wherein the operating lever includes a rotation preventing structure.

8. The shovel as claimed in claim 7, wherein the rotation preventing structure is a spigot joint.

9. The shovel as claimed in claim 1, wherein the lever part is connected to the holder part by a ball lock mechanism.

10. The shovel as claimed in claim 1, wherein the joint part is configured to be manually operated to tighten and untighten the connection of the lever part and the holder part to allow the lever part to be attached to and detached from the holder part in a tool-free manner.

11. The shovel as claimed in claim 1, further comprising:
    a remote control valve to which the holder part is fixed.

12. The shovel as claimed in claim 1, wherein the lever part is in direct contact with the holder part.

13. The shovel as claimed in claim 1, wherein the lever part is directly fit to the holder part.

14. The shovel as claimed in claim 1, wherein the holder part is configured to tilt in a direction in which the operating lever tilts.

15. A shovel comprising:
    an upper swing structure;
    a cab mounted on the upper swing structure; and
    an operating lever provided in the cab,
    wherein the operating lever includes
       a lever part to which a grip part is fixed,
       a holder part to which the lever part is connected, and
       a joint part connecting the lever part and the holder part,
    the lever part is detachably attached to the holder part via the joint part, and
    the joint part is a clamping ring including a thumbscrew.

16. A shovel comprising:
    an upper swing structure;
    a cab mounted on the upper swing structure; and
    an operating lever provided in the cab,
    wherein the operating lever includes
       a lever part to which a grip part is fixed,
       a holder part to which the lever part is connected, and
       a joint part connecting the lever part and the holder part,
    the lever part is detachably attached to the holder part via the joint part,
    the lever part includes a first flange part,
    the holder part includes a second flange part, and
    the lever part is connected to the holder part with the first flange part and the second flange part being tightened by the joint part.

17. An operating unit for a shovel, comprising:
    an operator seat;
    a console box installed on the operator seat;
    a boot attached to the console box; and
    an operating lever including
       a lever part to which a grip part is fixed, a holder part to which the lever part is connected, and
a joint part connecting the lever part and the holder part and positioned outside the console box, wherein the lever part is detachably attached to the holder part via the joint part, the joint part is covered by the boot, and the holder part is configured to move together with the operating lever.

* * * * *